(12) United States Patent
Minefuji

(10) Patent No.: US 7,667,898 B2
(45) Date of Patent: Feb. 23, 2010

(54) ZOOM LENS AND PROJECTOR

(75) Inventor: Nobutaka Minefuji, Asumino (JP)

(73) Assignee: Seiko Epson Corporation, Tokyo (JP)

( * ) Notice: Subject to any disclaimer, the term of this patent is extended or adjusted under 35 U.S.C. 154(b) by 109 days.

(21) Appl. No.: 11/874,650

(22) Filed: Oct. 18, 2007

(65) Prior Publication Data

US 2008/0106797 A1    May 8, 2008

(30) Foreign Application Priority Data

Nov. 6, 2006    (JP) .............................. 2006-299955

(51) Int. Cl.
*G02B 15/14* (2006.01)
(52) U.S. Cl. ...................... 359/680; 359/686
(58) Field of Classification Search ................ 359/680, 359/681, 682, 686
See application file for complete search history.

(56) References Cited

U.S. PATENT DOCUMENTS 4,687,302 A * 8/1987 Ikemori et al. .............. 359/686
5,867,326 A    2/1999 Yamamoto
6,970,298 B1 * 11/2005 Itoh .............................. 359/680

FOREIGN PATENT DOCUMENTS

| JP | A 2001-124989 | 5/2001 |
| JP | A 2001-188172 | 7/2001 |
| JP | A 2004-085979 | 3/2004 |
| JP | A 2004-279958 | 10/2004 |
| JP | A 2005-338702 | 12/2005 |
| JP | A-2006-39033 | 2/2006 |

* cited by examiner

*Primary Examiner*—David N Spector
(74) *Attorney, Agent, or Firm*—Oliff & Berridge, PLC

(57) ABSTRACT

A zoom lens includes a first lens group having negative power, a second lens group having positive power, a third lens group having positive power, and a fourth lens group having positive power, disposed in this order from the enlargement side to form the entire structure. At the time of zooming from the wide angle side to the telephoto side, the first lens group shifts from the enlargement side to the reduction side and the second and third lens groups shift from the reduction side to the enlargement side and the fourth lens group is fixed. The overall length of the zoom lens becomes the maximum at the wide angle end.

12 Claims, 21 Drawing Sheets

ZOOM LENS AND PROJECTOR

BACKGROUND

1. Technical Field

The present invention relates to a zoom lens used for projecting an image produced by using a liquid crystal panel or the like on a screen, and a projector including the zoom lens.

2. Related Art

A zoom lens included in a projector in related art has first through sixth lens groups as a combination of negative, positive, positive, negative, positive, and positive lenses positioned from the front to the rear on the screen side, and fixes the first and sixth lens groups and shifts the second through fifth lens groups at the time of power change (see JP-A-2005-338702).

Another zoom lens in related art has first through fourth lens groups as a combination of negative, positive, positive, and positive positioned from the front to the rear, and fixes the fourth lens group) and shifts the first through third lens groups all in the same direction at the time of power chance (see JP-A-2001-188172).

A further zoom lens in related art has first through fourth lens groups as a combination of negative, positive, negative, and positive positioned from the front to the rear, and fixes the fourth lens group and shifts the first through third lens groups all in the same direction at the time of power change (see JP-A-2004-85979).

A still further zoom lens in related art has first through fourth lens groups as a combination of negative, positive, positive, and positive positioned from the front to the rear, and fixes the first and fourth lens groups and shifts the second and third lens groups at the time of power change (see JP-A-2001-124989).

According to the zoom lens disclosed in JP-A-2005-338702, however, the structure having the six lens groups is complicated. In addition, the half angle of view is 35 degrees or smaller, and the variable power ratio is about 1.4 times at most. Recently, there is an increasing demand for development of a projection zoom lens having a wider angle so that a large image can be projected in a small room. Moreover, development of a zoom lens having higher variable power ratio which provides higher degree of freedom for installation has been desired. Furthermore, miniaturization of the zoom lens and reduction of the number of constituent lenses have been important factors to be achieved so as to reduce the size and cost of the entire projection apparatus.

According to the zoom lens disclosed in JP-A-2001-188172, the F number is 2 at the wide angle end. However, the angle of view is small, and the number of the constituent lenses is large. In addition, the variable power ratio of the zoom lens is as small as 1.3 times.

According to the zoom lens disclosed in JP-A-2004-85979, the number of the constituent lenses is small and the angle of view is large. However, the F number is 2.5 at the wide angle end and thus brightness is insufficient under this condition. In addition, the variable power ratio of the zoom lens is as small as 1.2 times.

According to the zoom lens disclosed in JP-A-2001-124939, the F number is 1.5 at the wide angle end in the first example of the reference. However, the angle of view is small and the number of constituent lenses is large. According to the second example of the reference, the F number is 2 at the wide angle end and the angle of view is as large as 69 degrees. However, the variable power ratio is only 1.2 times.

SUMMARY

Accordingly, it is an advantage of some aspects of the invention to provide a zoom lens which easily achieves reduction of size and cost and satisfies needs for wider angle and higher variable power ratio.

It is another advantage of some aspects of the invention to provide a projector including this zoom lens.

A zoom lens according to an aspect of the invention includes a first lens group having negative power, a second lens group having positive power, a third lens group having positive powers and a fourth lens group having positive power, which first through fourth lens groups are disposed in this order from the enlargement side. At the time of zooming from the wide angle side to the telephoto side, the first lens group shifts from the enlargement side to the reduction side and the second and third lens groups shift from the reduction side to the enlargement side and the fourth lens group is fixed. The overall length of the zoom lens becomes the maximum at the wide angle end.

In this case, the first lens group shifts from the reduction side to the enlargement side and the overall length of the zoom lens increases to the maximum at the wide angle end during the time of zooming from the telephoto side to the wide angle side. Thus, in case of providing relatively large angle of view, aberration produced at the time of wide angle can be compensated relatively easily. In this case, high variable power ratio can also be achieved relatively easily. These advantages of wider angle and higher variable power ratio can reduce the number of the constituent lenses and the size, which contributes to miniaturization and cost reduction of the zoom lens.

In a specific aspect or example of the above aspect of the invention, the first lens group has three negative lenses and at least one positive lens. The lens having the weakest negative power in the first lens group is an aspherical surface lens. Assuming that the focal length of the entire system at the wide angle end is Fw and that the focal length of the first lens group is F1, the first lens group satisfies the following conditional expression:

$$0.25 < |Fw/F1| < 0.45 \quad (1)$$

In this case, the first lens group has three negative lenses and at least one positive lens, and reduces aberration while decreasing the entire lens diameter. Moreover, the lens having the weakest negative power in the first lens group is an aspherical surface lens, and various aberrations can be efficiently compensated by using the aspherical surface lens which can be made of resin materials easily affected by the environmental change such as change in temperature, humidity and the like. Furthermore, since the first lens group satisfies the condition of power specified by the conditional expression (1), the compactness increases while preventing generation of astigmatism and distorting aberration which is a problem easily arising particularly from the wide angle lens having large angle of view. In addition, it is possible to secure sufficient back focus for inserting the dichroic prism necessary for the three-plate-type projector.

When the negative power of the first lens group is too weak under the lower limit of the conditional expression (1), off-axis rays entering at wide angles cannot be sufficiently refracted. As a result, the size of the entire first lens group, and also the sizes of the second lens group and the subsequent lens groups increase. When the negative power of the first lens group is too weak, the retro focusing characteristics are lowered. As a result, the sufficient back focus for allowing a color synthesizing prism or the like to be disposed between the fourth lens group and the conjugate point on the reduction side cannot be produced. When the negative power of the first lens group is too strong over the upper limit of the conditional expression (1) generation of astigmatism and distorting aberration increases in the first lens group. As a result, the cost rises due to the necessity for increasing the number of the constituent lenses, and aberration compensation by the second and subsequent lenses becomes difficult.

In another example of the above aspect of the invention, the first lens group has four sections and five lenses containing: a negative meniscus lens (first lens) having convex surface on the enlargement side, a negative meniscus lens (second lens) having the weakest negative power in the first lens group and having convex surface on the enlargement side, a combination lens (third lens) having positive lens and negative lens and having concave surface on the reduction side, and a positive lens (fourth lens) having convex surface on the enlargement side, disposed in this order from the enlargement side. The first lens disposed closest to the enlargement side of the first lens group is a negative lens having a deep meniscus shape and convex surface on the enlargement side, and has function for sufficiently refracting off-axis rays covering a wide angle of view and thus decreasing the lens diameters of the second and subsequent lenses. The second lens has weak negative power and aspherical surface, and thus can efficiently compensate astigmatism and distorting aberration generated at the first lens. Since the negative power of the second lens is weak, the second lens can be made of resin materials easily affected by the environmental change such as change in temperature and humidity or other materials. The third lens can be formed by a combination lens of positive and negative lenses or negative and positive lenses, and has function for reducing color aberration generated within the first lens group in cooperation with the positive fourth lens. When the first lens group has the three negative lenses and two positive lenses as in this case, the negative lens included in the third lens has strong negative power and concave surfaces on both sides. In this case, it is preferable to provide this strong negative power lens as a combination lens combined with the positive lens so that stable performance can be achieved.

In a further example of the above aspect of the invention, the first lens group has four sections and four lenses containing: a negative meniscus lens (first lens) having convex surface on the enlargement side, a negative meniscus lens (second lens) having the weakest negative power in the first lens group and having convex surface on the enlargement side, a negative lens (third lens) having the strongest negative power in the first lens group and having concave surfaces on both sides, and a positive lens (fourth lens) having convex surfaces on both sides, disposed in this order from the enlargement side. The first lens is a negative lens having a deep meniscus shape and convex surface on the enlargement side, and has function for sufficiently refracting off-axis rays covering a wide angle of view and thus decreasing the lens diameters of the second and subsequent lenses. The second lens has weak negative power and aspherical surface, and thus can efficiently compensate astigmatism and distorting aberration generated at the first lens. Since the negative power of the second lens is weak, the second lens can be made of resin materials easily affected by the environmental change such as change in temperature and humidity or other materials.

In a still further example of the above aspect of the invention, the second lens group has one positive lens having convex surface on the enlargement side. Assuming that the focal length of the entire system at the wide angle end is Fw and that the focal length of the second lens group is F2, the second lens group satisfies the following conditional expression:

$$0.1 < |Fw/F2| < 0.35 \quad (2)$$

The second lens group having the above structure has a function chiefly for varying power at the time of zooming. The second lens group can prevent particularly generation of spherical aberration by appropriately distributing positive power, and reduce the entire size of the lens by controlling the shift amount at the time of power change.

When the positive power of the second lens is too weak under the lower limit of the conditional expression (2), the shift amount of the second lens group at the time of power change from the wide angle end to the telephoto end increases. As a result, the size reduction becomes difficult. When the positive power of the second lens group is too strong over the upper limit of the conditional expression (2), particularly spherical aberration cannot be reduced. In this case, other additional lens as well as the one positive lens is necessary to constitute the second lens group. In addition, undesirable variation in aberration fluctuation at the time of power change is caused.

In still further example of the above aspect of the invention, the third lens group has a combination lens having negative lens and positive lens, and a positive lens having convex surface on the reduction side, disposed in this order from the enlargement side. At least the reduction side surface of the combination lens is an aspherical surface. The third lens group having this structure has a function for gradually separating light having passed through the diaphragm from the optical axis to finally obtain preferable telecentric characteristics while compensating various aberrations remaining after the first and second lens groups. In this example, the third lens group has the three lenses containing the meniscus-shaped combination lens having negative lens and positive lens with convex surface formed on the reduction side, and the positive lens having convex surface on the reduction side. In addition, the reduction side surface of the combination lens is an spherical surface. Thus, the third lens group can effectively compensate spherical aberration. Moreover, variations produced at the time of zoom lens assembly can be reduced by combining the negative lens of the third lens group disposed on the enlargement side, which lens has strong power as one body, with the subsequent positive lens as a combination lens.

In still further example of the above aspect of the invention, the fourth lens group has one positive lens having convex surface on the enlargement side. Assuming that the focal length of the entire system at the wide angle end is Fw and that the focal length of the fourth lens group is F4, the fourth lens group satisfies the following conditional expression:

$$0.05 < |Fw/F4| < 0.3 \quad (3)$$

The fourth lens group having this structure has a function for obtaining telecentric characteristics without increasing various aberrations having been appropriately compensated.

When the positive power of the fourth lens group is too weak under the lower limit of the conditional expression (3), it is difficult to secure sufficient telecentric characteristics. For obtaining sufficient telecentric characteristics, the positive power of the third lens group needs to be raised. In this case, spherical aberration and field curvature cannot be compensated in a balanced manner. When the positive power of the fourth lens group is too strong over the upper limit of the conditional expression (3), generation of aberration particularly in the peripheral area of the screen cannot be reduced by the structure of the fourth lens group having only one positive lens.

A projector according to another aspect of the invention includes an image forming device that forms an image, and the zoom lens described in one of the above examples for projecting the image formed by the image forming device.

The projector, which includes the zoom lens capable of easily compensating aberration at the time of wide angle and easily achieving high variable power ratio, is compact and inexpensive, and can project a large image in a small room.

BRIEF DESCRIPTION OF THE DRAWINGS

The invention will be described with reference to the accompanying drawings, wherein like numbers refer to like elements.

DESCRIPTION OF EXEMPLARY EMBODIMENTS

First Embodiment

Figure 1A:
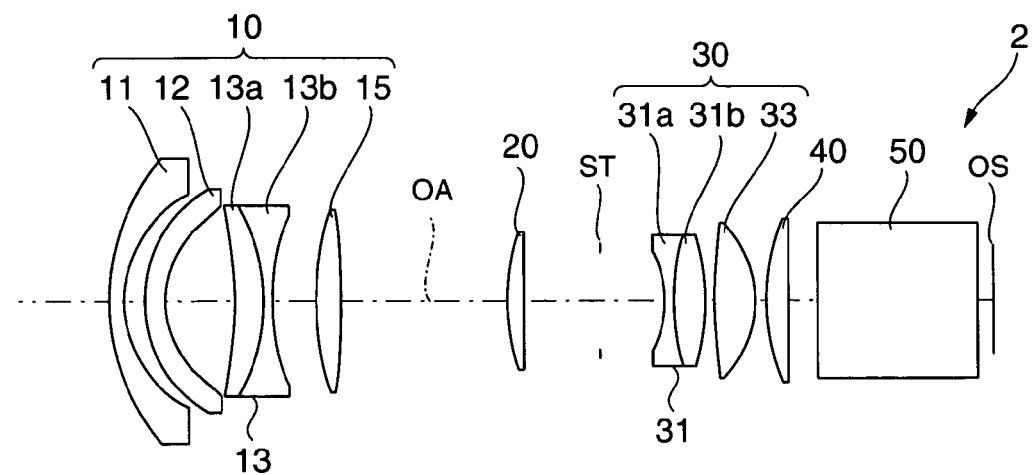
FIGS. 1A and 1B illustrate a structure of a zoom lens according to a first embodiment.
Figure 1B:
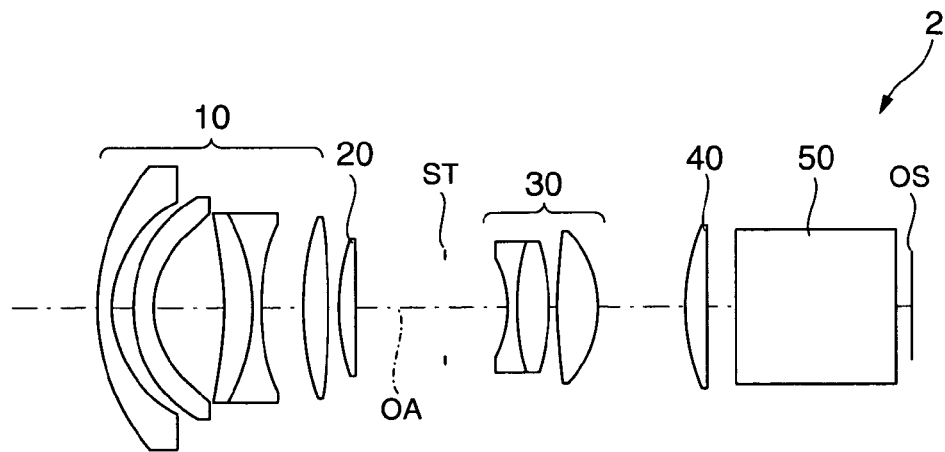

FIGS. 1A and 1B illustrate a lens structure of a zoom, lens according to a first embodiment of the invention. FIGS. 1A and 1B show conditions of a zoom lens 2 at the wide angle end (wide) and the telephoto end (tele), respectively.

The zoom lens 2 shown in FIGS. 1A and 1B enlarges an image formed on an object surface OS and projects the image on a not-shown screen. The zoom lens 2 has a first lens group 10 having negative power, a second lens group 20 having positive power, a third lens group 30 having positive power, and a fourth lens group 40 having positive power, disposed in this order from the screen side as the enlargement side (left side in FIGS. 1A and 1B) to the object surface OS side as the reduction side (right side in FIGS. 1A and 1B). The lens group herein refers to a group which contains one or more lenses including the case of only one lens. Therefore, though each of the second lens group 20 and the fourth lens group 40 contains one lens in the following description, these groups are referred to as "lens group" for simplifying the explanation.

The zoom lens 2 is so designed as to be substantially telecentric on the object surface OS side. A synthesizing prism 50 for synthesizing three color images is provided between the fourth lens group 40 at the rear end of the zoom lens 2 and the object surface OS on which a liquid crystal display panel is disposed. Though object surfaces on which the other two color liquid crystal display panels are disposed are not shown in the figures, these surfaces are located at positions equivalent to the position of the object surface OS shown in the figures. In FIGS. 1A and 1B, lights having constant expansion around a principal ray perpendicular to the object surface OS and parallel with an optical axis OA are emitted from respective object points on the object surface OS. These lights advance to the left, passes through the zoom lens 2, and are finally projected on the screen.

At the time of zooming, i.e., power change of the zoom lens 2, the first, second, and third lens groups 10, 20, and 30 are shifted on the optical axis OA with the fourth lens group 40 fixed. In case of power change from the wide angle end side to the telephoto end side, the first lens group 10 of the three movable lens groups 10, 20 and 30 gradually shifts toward the object surface OS side along the optical axis OA. The second and third lens groups 20 and 30 gradually shift toward the screen side along the optical axis OA while varying the distance between each other. In case of power change from the telephoto end side to the wide angle end side, the first lens group 10 of the three movable lens groups 10, 20 and 30 gradually shifts toward the screen side along the optical axis OA. The second and third lens groups 20 and 30 gradually shift toward the object surface OS side along the optical axis OA while varying the distance between each other. Focusing when the distance to the screen is changed can be achieved by shifting the first lens group 10 to the direction of the optical axis OA.

The first lens group 10 includes four sections and five lenses containing: a first negative meniscus lens 11 having convex surface on the screen side; a second negative meniscus lens 12 having convex surface on the screen side; a negative power combination lens 13 having concave surface on the object surface OS side; and a positive lens 5 having convex surfaces on both the screen side and object surface OS side in this order from the screen side (enlargement side) to the object surface OS side (reduction side). These lenses shift as one piece along the optical axis OA at the time of power change. The second negative meniscus lens 12 has the weakest negative power in the lenses of the first lens group 10. The combination lens 13 has a positive meniscus lens 13a disposed on the screen side and having concave surface on the screen side, and a negative lens 13b disposed on the object surface OS side and having concave surfaces on both sides.

The first negative meniscus lens 11 disposed at the position closest to the screen side in the first lens group 10 has a deep meniscus shape having convex surface on the screen side, and can sufficiently refract off-axis rays covering a wide angle of view. This shape of the first negative meniscus lens 11 reduces the lens diameters of the subsequent lenses 12, 13 and 15. The second negative meniscus lens 12, which is an aspherical surface lens formed by resin material or the like, efficiently compensates astigmatism and distorting aberration produced at the first negative meniscus lens 11. The second negative meniscus lens 12 has weak negative power, and thus is not easily affected by the environmental change even though the meniscus lens 12 is formed by resin material. The combination lens 13 has a function for reducing color aberration produced within the first lens group 10 in cooperation with the subsequent positive lens 15.

The first lens group 10 satisfies the following conditional expression on the assumption that the focal length of the lens group 10 is F1 and that the focal length of the entire system at the wide angle end is Fw:

$$0.25 < |Fw/F1| < 0.45 \quad (1)$$

Since the first lens group 10 has power increased to such an extent that the requirement for the lower limit in the conditional expression (1) is satisfied, the off-axis rays entering at wide angles can be sufficiently refracted. As a result, increase in sizes of the entire first lens group 10, the second lens group 20, and the subsequent lens groups is prevented. Moreover, according to the first lens group 10 having appropriately increased power as discussed above, the first lens group 10 securely obtains retro-focusing characteristics, and sufficient back focus for allowing the synthesizing prism 50 to be disposed between the fourth lens group 40 and the object surface OS can be secured. Furthermore, since the first lens group 10 has power reduced to such an extent that the requirement for the upper limit in the conditional expression (1) is satisfied, astigmatism and distorting aberration produced within the first lens group 10 can be reduced without necessity for adding constituent lenses. This contributes to cost reduction.

The second lens group 20 has only one positive lens having convex surfaces on both the screen side and the object surface OS side, and shifts along the optical axis OA at the time of power change. It is thus possible to control the shift amount of the second lens group 20 at the time of power change while reducing particularly spherical aberration by appropriately distributing positive power given to the second lens group 20. As a result, size reduction of the entire lens can be achieved.

The second lens group 20 satisfies the following conditional expression, assuming that the focal length of the lens group 20 is F2:

$$0.1 < |Fw/F2| < 0.35 \quad (2)$$

Since the second lens group 20 has power increased to such an extent that the requirement for the lower limit in the conditional expression (2) is satisfied, increase in the shift amount of the second lens group 20 between the wide angle end and the telephoto end at the time of power change is reduced. As a result, the size of the zoom lens 2 can be decreased. Moreover, since the second lens group 20 has power reduced to such an extent that the requirement for the upper limit in the conditional expression (2) is satisfied, particularly spherical aberration is reduced. In this case, aberration fluctuation at the time of power change can also be decreased.

The third lens group 30 has two sections and three lenses containing: a combination lens 31 having convex surface on the object surface OS side; and a positive lens 33 having convex surfaces on both the screen side and the object surface OS side in this order from the screen side. These lenses shift as one body along the optical axis OA at the time of power change. The combination lens 31 has a negative lens 31a having concave surfaces on both sides and disposed on the screen side, and a positive lens 31b having convex surfaces on both sides and disposed on the object surface OS side.

The third lens group 30 having this structure has a function for gradually separating lights passing through a diaphragm ST from the optical axis OA to finally obtain preferable telecentric characteristics while compensating spherical aberration and other aberrations remaining after the first lens group 10 and second lens group 20. In this case, generation of spherical aberration is effectively reduced by forming aspherical surface on the object surface OS side convex surface of the combination lens 31. Since the screen side negative lens 31a of the combination lens 31 included in the third lens group 30 has strong power as the single lens, variation in quality at the time of assembly of the zoom lens can be reduced by combining the negative lens 31a with the subsequent positive lens 31b as a combination lens.

The fourth lens group 40 has only one positive lens having convex surfaces on both the screen side and the object surface OS side, and shifts along the optical axis OA at the time of power change. At the time of power change by using the first lens group 10 through the third lens group 30, the fourth lens group 40 securely provides telecentric characteristics without increasing the aberrations having been appropriately compensated.

The fourth lens group 40 satisfies the following conditional expression, assuming that the focal length of the fourth lens group 40 is F4:

$$0.05 < |Fw/F4| < 0.3 \quad (3)$$

Since the fourth lens group 40 has power increased to such an extent that the requirement for the lower limit in the conditional expression (3) is satisfied, the fourth lens group 40 can securely provides sufficient telecentric characteristics without raising positive power of the third lens group 30 positioned before the fourth lens group 40. When the positive power of the third lens group 30 is increased to secure the telecentric characteristics, spherical aberration and image surface curve cannot be compensated in a balanced manner. Moreover, according to the fourth lens group 40 having power reduced to such an extent that the requirement for the upper limit in the conditional expression (3) is satisfied, aberration produced particularly in the peripheral area of the screen can be reduced even though the fourth lens group 40 has only one positive lens.

EXAMPLE 1

Example 1 which numerically specifies the zoom lens 2 shown in FIGS. 1A and 1B is now discussed. The following Table 1 shows lens data of the zoom lens 2 in Example 1.

TABLE 1

Example 1
f = 10.5-15.75
FNo = 1.7-1.93
2ω = 85.0°-62.9°

| surface No. | r | D | Nd | Vd |
|---|---|---|---|---|
| 0 | | d0 | | |
| 1 | 40.0534 | 2.50 | 1.84666 | 23.78 |
| 2 | 21.5737 | 3.73 | | |
| 3 | 27.9932 | 3.50 | 1.52500 | 56.70 |
| 4 | 17.4959 | 12.05 | | |
| 5 | −84.8693 | 5.00 | 1.80518 | 25.46 |
| 6 | −36.5323 | 1.40 | 1.77250 | 49.62 |
| 7 | 38.4181 | 7.73 | | |
| 8 | 58.1366 | 4.20 | 1.72825 | 28.32 |
| 9 | −141.5899 | d9 | | |
| 10 | 43.7732 | 2.83 | 1.80611 | 40.73 |
| 11 | −1599.2561 | d11 | | |
| diaphragm | ∞ | 11.25 | | |
| 13 | −19.8628 | 1.54 | 1.72825 | 28.32 |
| 14 | 42.2431 | 5.50 | 1.58913 | 61.25 |
| 15 | −32.9038 | 1.55 | | |
| 16 | 107.2589 | 7.00 | 1.49700 | 81.61 |
| 17 | −20.5980 | d17 | | |
| 18 | 38.9080 | 3.92 | 1.49700 | 81.61 |
| 19 | −1000.0000 | 5.00 | | |
| 20 | ∞ | 27.60 | 1.51680 | 64.20 |
| 21 | ∞ | 3.00 | | |

| variable distance | wide angle end | focal length mid-point | telephoto end |
|---|---|---|---|
| d0 | 2000.00 | 2000.00 | 2000.00 |
| d9 | 29.54 | 13.94 | 2.04 |
| d11 | 13.63 | 14.97 | 15.77 |
| d17 | 2.00 | 8.09 | 15.23 |

| aspherical surface coefficient | surface 3 | surface 4 | surface 15 |
|---|---|---|---|
| K | 0.00000E+00 | −2.50000E−01 | 0.00000E+00 |
| A04 | 2.40494E−05 | 1.82953E−05 | 2.01135E−05 |
| A06 | −6.59334E−08 | −1.34766E−07 | 5.09953E−08 |
| A08 | 1.41030E−10 | 9.16696E−11 | 7.01795E−11 |
| A10 | 0.00000E+00 | 9.86582E−13 | 0.00000E+00 |
| A12 | 0.00000E+00 | −2.90147E−15 | 0.00000E+00 |

In the upper section of Table 1: "surface No." is number given to the respective lens surfaces counted from the screen side; "r" is radius of curvature; "D" is lens thickness or air space from subsequent surface; "Nd" is refractive index of lens material on d line; and "Vd" is Abbe number of lens material on d line. Distances d0, d9, d11 and d17 in the section "D" are variable distances, and values of the respective distances d0, d9, d11 and d17 at "wide angle end", "focal length mid-point" and "telephoto end" are shown in the middle section of Table 1.

In Example 1, the first through fourth lens groups 10 through 40 are basically formed by spherical surfaces. However, as discussed above, the entrance and exit surfaces of the negative meniscus lens 12 (surfaces Nos. 3 and 4 in Table 1) and the exit surface of the combination lens 31 (surface No. 15 in Table 1) are aspherical surfaces. A displacement amount x of each aspherical surface shape from its surface top in the direction of the optical axis can be expressed by the following equation:

$$x = \frac{c \cdot h^2}{1 + \sqrt{1 - (1+k) \cdot c^2 \cdot h^2}} + A04 \cdot h^4 + A06 \cdot h^6 + A08 \cdot h^8 + A10 \cdot h^{10} + A12 \cdot h^{12}$$

wherein: c is inverse number of paraxial radius of curvature; h is height from optical axis; k is cone coefficient; and A04 through A12 are higher aspherical surface coefficients. In Example 1, the values of the respective coefficients "k" and "A04"-"A12" in the above aspherical surface equation are shown in the lower section of Table 1.

The resultant specifications of the zoom lens 2 in Example 1 are f=10.5-15.75 as focal length f, FNo=1.7-1.95 as f number, and 2ω=85.0°-62.9° as angle of view 2ω in this case.

Figure 2:
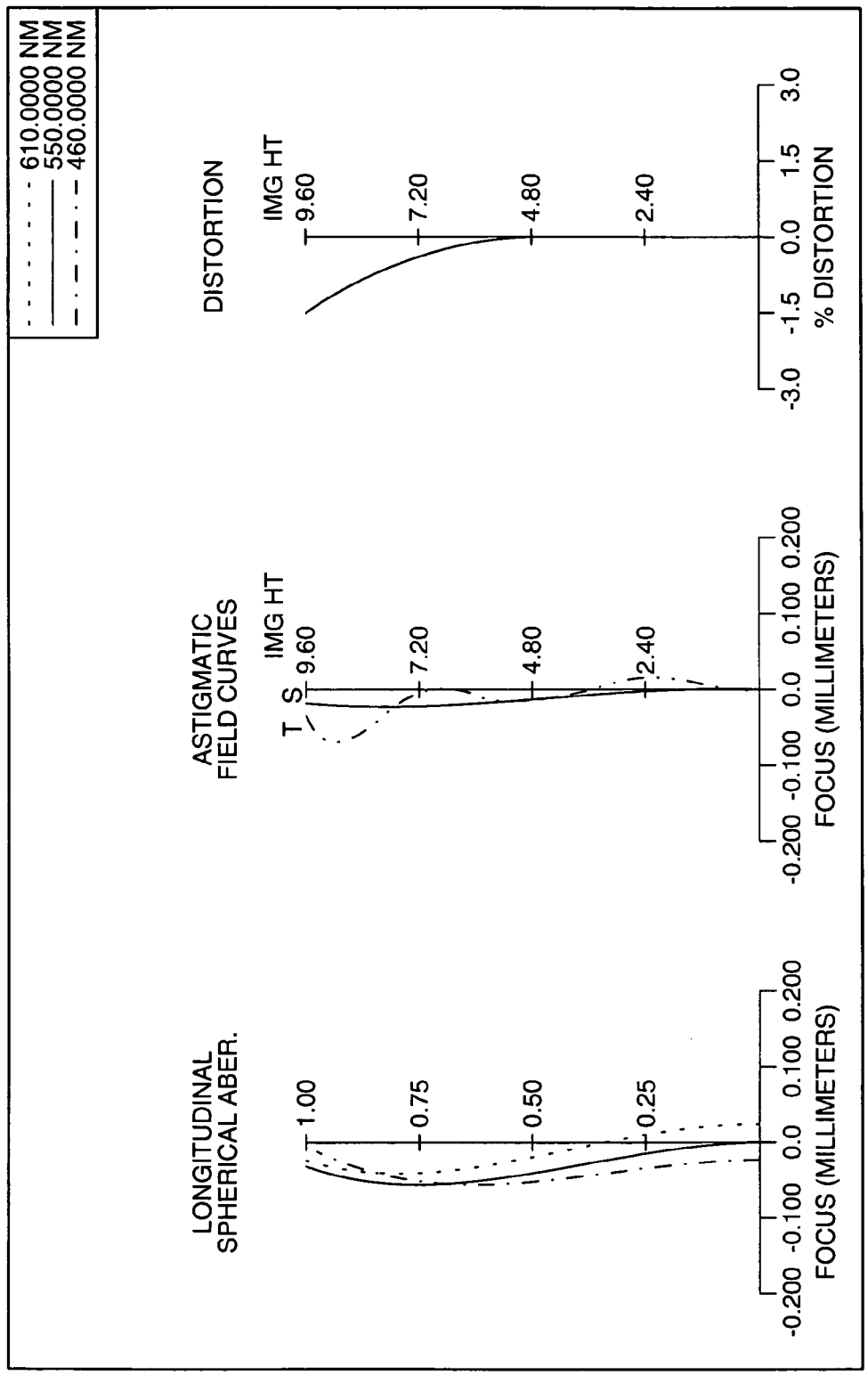
FIG. 2 shows spherical surface aberration, astigmatism, and distorting aberration at wide angle end in Example 1.

FIG. 2 shows aberrations at the wide angle end n Example 1. These are aberrations on the reduction side (object surface OS side) when the distance on the enlargement side (screen side) is 2 m. The left graph in the figure shows spherical aberrations of respective colors at reference wavelength of 550 nm and other wavelengths of 610 nm and 460 nm. The central graph in the figure shows astigmatism at the wavelength of 550 nm. The right graph in the figure shows distorting aberration at wavelength of 550 nm.

Figure 3:
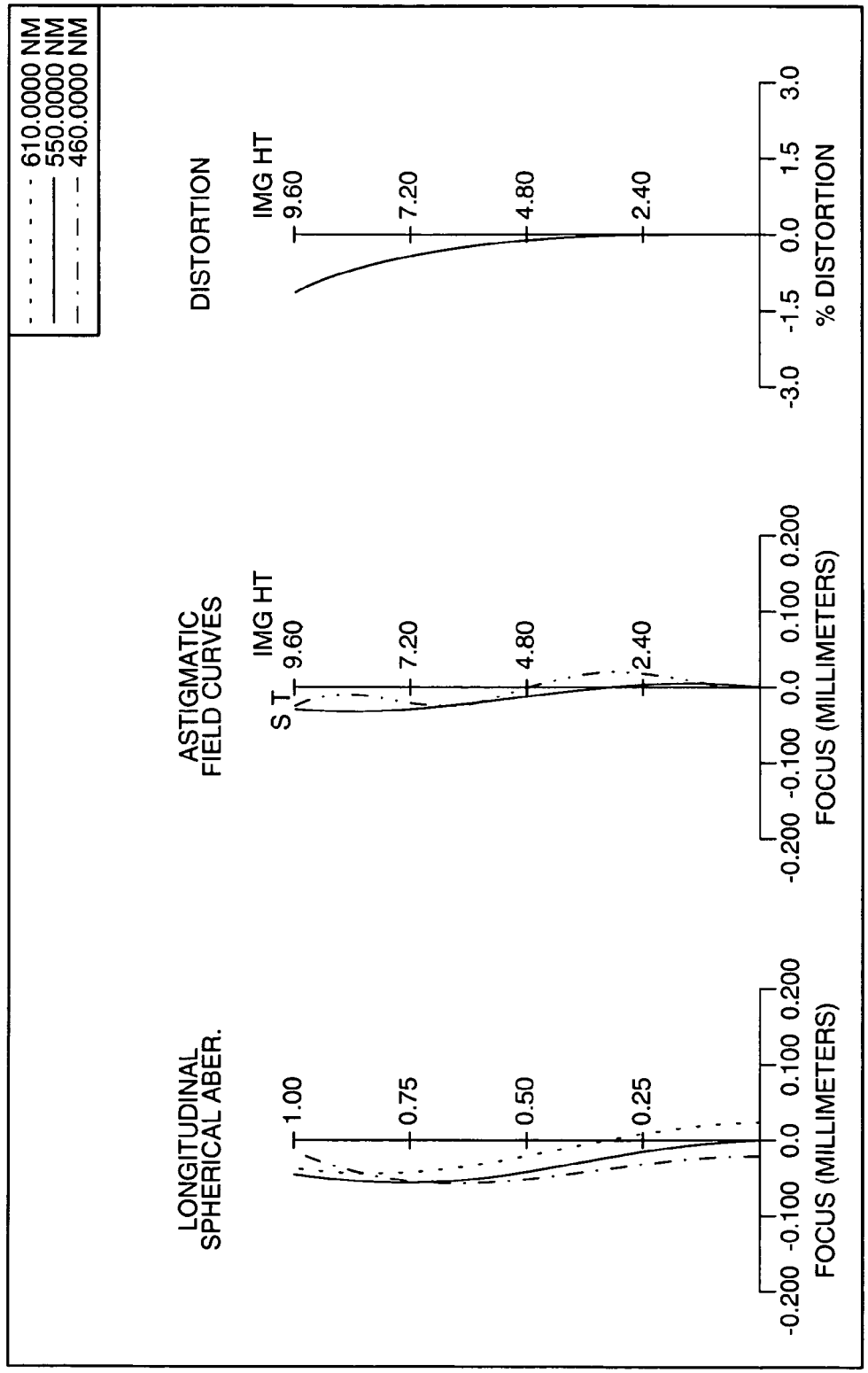
FIG. 3 snows spherical surface aberration, astigmatism, and distorting aberration at focal length mid-point in Example 1.

FIG. 3 shows aberrations at the focal length mid-point in Example 1 in correspondence with FIG. 2. The left graph shows spherical aberrations of respective colors. The central graph shows astigmatism. The right graph shows distorting aberration.

Figure 4:
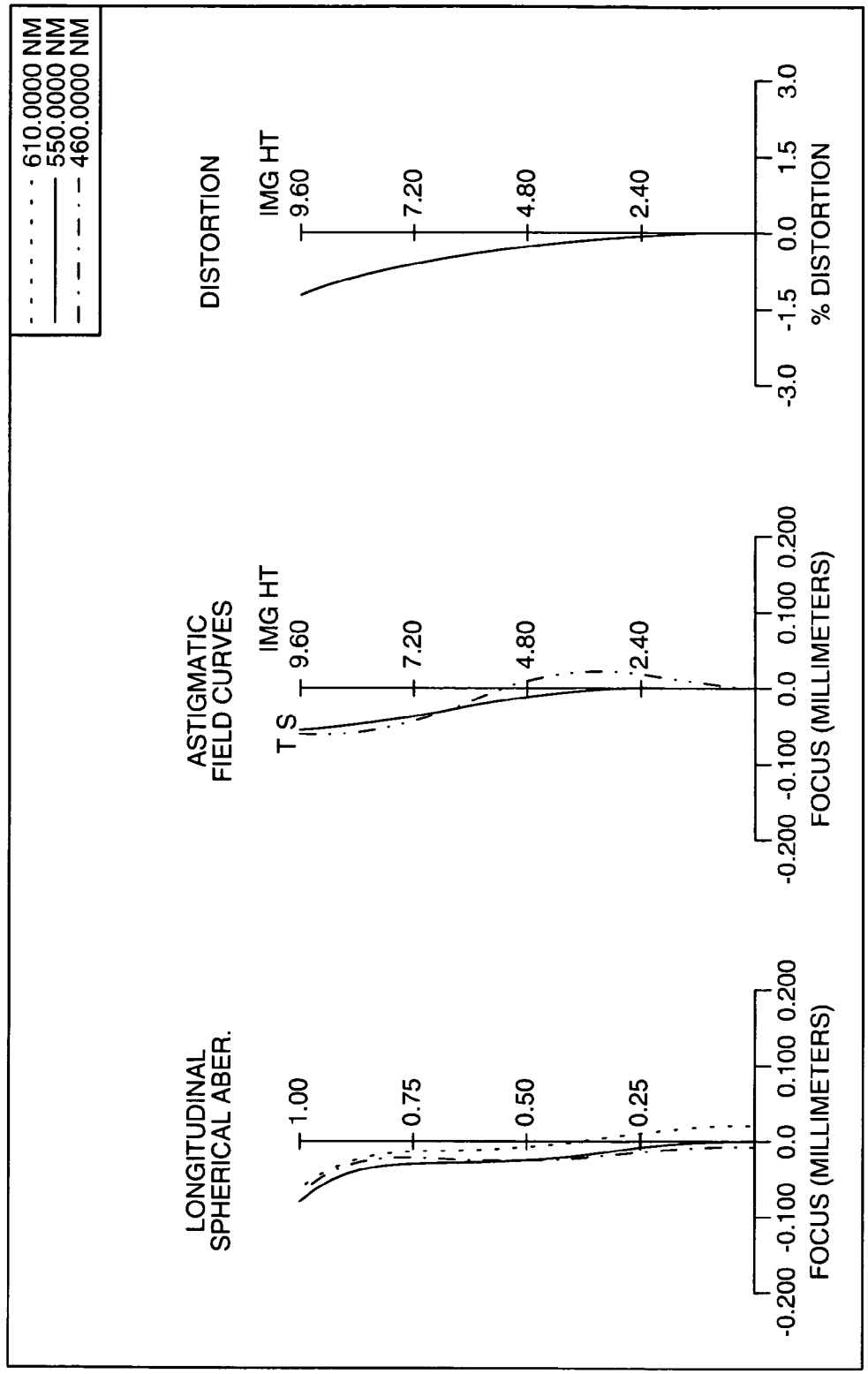
FIG. 4 shows spherical surface aberration, astigmatism, and distorting aberration at telephoto end in Example 1.

FIG. 4 shows aberrations at the telephoto end in Example 1 in correspondence with FIG. 2. The left graph shows spherical aberrations of respective colors. The central graph shows astigmatism. The right graph shows distorting aberration.

Second Embodiment

Figure 5:
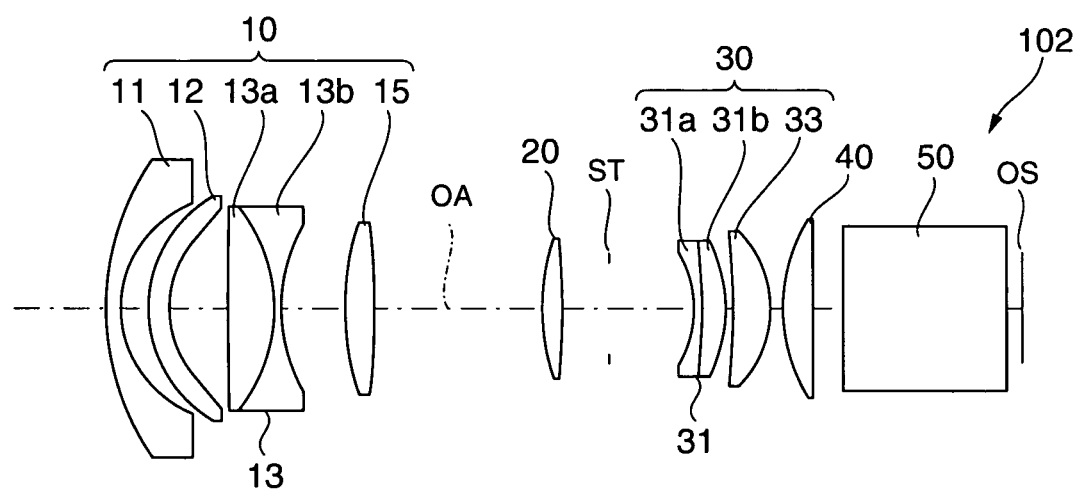
FIG. 5 illustrates a structure of a zoom lens according to a second embodiment.

FIG. 5 shows a lens structure of a zoom lens according to a second embodiment. This figure illustrates a zoom lens 102 at the wide angle end. The zoom lens 102 in this embodiment is a modification of the zoom lens 2 in the first embodiment shown in FIGS. 1A and 1B, and constructions not specifically explained herein are similar to those of the zoom lens 2 in, the first embodiment.

The zoom lens 102 shown in FIG. 5 includes the first lens group 10 having negative power, the second lens group 20 having positive power, the third lens group 30 having positive power, and the fourth lens group 40 having positive power disposed in this order from the screen side to the object surface OS side. The zoom lens 102 is substantially telecentric on the object surface OS side. The synthesizing prism 50 is interposed between the fourth lens group 40 and the object surface OS.

In case of power change from the wide angle end side to the telephoto end side, the first lens group 10 of the three movable lens groups 10, 20 and 30 gradually shifts toward the object surface OS side along the optical axis OA. The second and third lens groups 20 and 30 gradually shift toward the screen side along the optical axis OA while varying the distance between each other. In case of power change from the telephoto end side to the wide angle end side, the first lens group 10 of the three movable lens groups 10, 20 and 30 gradually shifts toward the screen side along the optical axis OA. The second and third lens groups 20 and 30 gradually shift toward the object surface OS side along the optical axis OA while varying the distance between each other. Focusing when the distance to the screen is changed can be achieved by shifting the first lens group 10 in the direction of the optical axis OA.

The structure of the first lens group 10 is substantially the same as that of the first lens group 10 included in the zoom lens 2 in the first embodiment. However, the combination lens 13 of the zoom lens 102 has the positive lens 13a having convex surfaces on both sides and disposed on the screen side, and the negative lens 13b having concave surfaces on both sides and disposed on the object surface OS side. The third lens group 30 has two sections and three lenses containing: the combination lens 31 having convex surface on the object surface OS side; and the positive meniscus lens 33 having convex surface on the object surface OS side disposed in this order from the screen. The combination lens 31, has the negative meniscus lens 31a having concave surface on the screen side and disposed on the screen side, and the positive meniscus lens 31b having convex surface on the object surface OS side and disposed on the object surface OS side. The object surface OS side of the combination lens 31, that is, the convex surface of the positive meniscus lens 31b is an aspherical surface. The fourth lens group 40 has only one positive lens having convex surface on the screen side. The zoom lens 102 satisfies the conditional expressions (1) through (3) similarly to the zoom lens 2 in the first embodiment shown in FIGS. 1A and 1B, and obtains characteristics similar to those of the zoom lens 2 in the first embodiment.

EXAMPLE 2

Example 2 which numerically specifies the zoom lens 102 shown in FIG. 5 is now discussed. The following Table 2 shows lens data of the zoom lens 102 in Example 2.

TABLE 2

Example 2
f = 9.8-14.7
FNo = 1.87-2.12
2ω = 88.9°-66.5°

| surface No. | r | D | Nd | Vd |
|---|---|---|---|---|
| 0 | | d0 | | |
| 1 | 48.694 | 2.50 | 1.84666 | 23.78 |
| 2 | 20.683 | 4.51 | | |
| 3 | 28.277 | 3.50 | 1.52500 | 56.70 |
| 4 | 18.851 | 9.95 | | |
| 5 | 575.000 | 8.00 | 1.84666 | 23.78 |
| 6 | −27.987 | 1.30 | 1.77250 | 49.62 |
| 7 | 32.291 | 10.57 | | |
| 8 | 51.018 | 4.83 | 1.60342 | 38.01 |
| 9 | −228.638 | d9 | | |
| 10 | 40.049 | 3.36 | 1.56732 | 42.84 |
| 11 | −227.153 | d11 | | |
| diaphragm | ∞ | 14.61 | | |
| 13 | −18.571 | 1.20 | 1.84666 | 23.78 |
| 14 | −133.221 | 4.00 | 1.69350 | 53.34 |
| 15 | −25.798 | 1.19 | | |
| 16 | −138.368 | 6.50 | 1.49700 | 81.61 |
| 17 | −19.451 | d17 | | |
| 18 | 29.262 | 5.12 | 1.49700 | 81.61 |
| 19 | 638.584 | 5.00 | | |
| 20 | ∞ | 27.60 | 1.51680 | 64.20 |
| 21 | ∞ | 3.00 | | |

| variable distance | wide angle end | focal length mid-point | telephoto end |
|---|---|---|---|
| d0 | 2000.00 | 2000.00 | 2000.00 |
| d9 | 29.24 | 12.05 | 2.10 |
| d11 | 8.11 | 11.60 | 13.43 |
| d17 | 2.00 | 9.21 | 15.77 |

TABLE 2-continued

Example 2
f = 9.8-14.7
FNo = 1.87-2.12
2ω = 88.9°-66.5°

| aspherical surface coefficient | surface 3 | surface 4 | surface 15 |
|---|---|---|---|
| K | 0.00000E+00 | −2.50000E−01 | 0.00000E+00 |
| A04 | 3.32859E−05 | 2.34623E−05 | 1.65945E−05 |
| A06 | −8.11028E−08 | −1.30777E−07 | 2.54507E−08 |
| A08 | 1.41788E−10 | −3.14295E−12 | 1.74618E−10 |
| A10 | −1.07290E−13 | 2.80373E−13 | −4.81350E−13 |
| A12 | 0.00000E+00 | −8.04964E−16 | 0.00000E+00 |

In the upper section of Table 2, "surface No.", "r", "D", "Nd", "Vd" and other items are shovel. In the middle section of Table 2, values of the respective distances d0, d9, d11 and d17 at "wide angle end", "focal length mid-point" and "telephoto end" in Example 2 are shown. In Example 2, the surface Nos. 3, 4 and 15 are aspherical surfaces similarly to those in Example 1 shown in Table 1, and have aspherical surface shapes corresponding to the respective coefficients "k", and "A04"-"A12" shown in the lower section of Table 2.

The resultant specifications in Example 2 are f=9.8-14.7 as focal length f, FNo=−1.87-2.12 as f number, and 2ω=88.9°-66.5° as angle of view 2ω in this case.

Figure 6:
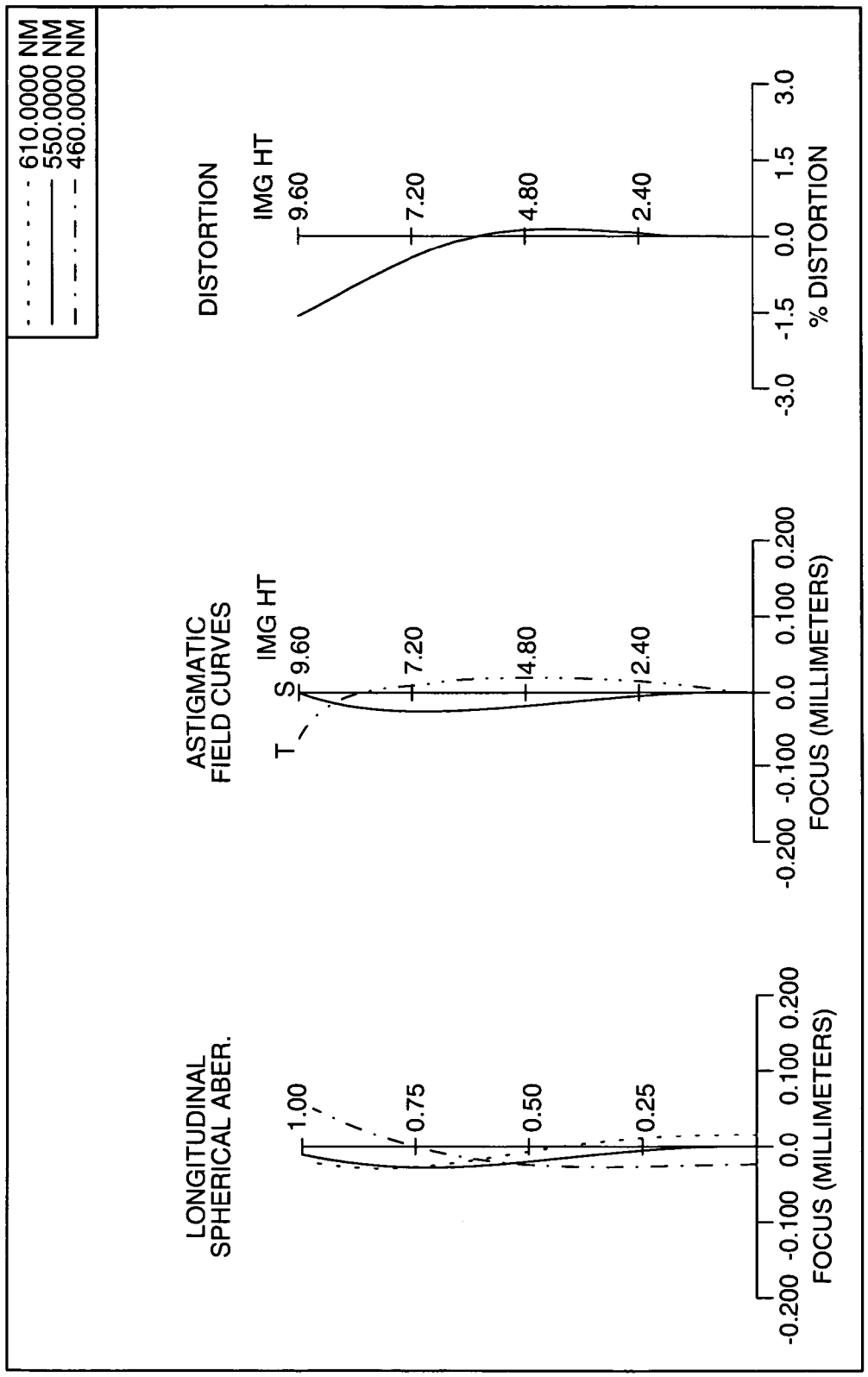
FIG. 6 shows spherical surface aberration, astigmatism, and distorting aberration at wide angle end in Example 2.

FIG. 6 shows aberrations at the wide angle end in Example 2. These are aberrations on the reduction side when the distance on the enlargement side is 2 m. The left graph in the figure shows spherical aberrations of respective colors at reference wavelength of 550 nm and other wavelengths of 610 nm and 460 nm. The central, graph in the figure shows astigmatism at the wavelength of 550 nm. The right graph in the figure shows distorting aberration at wavelength of 550 nm.

Figure 7:
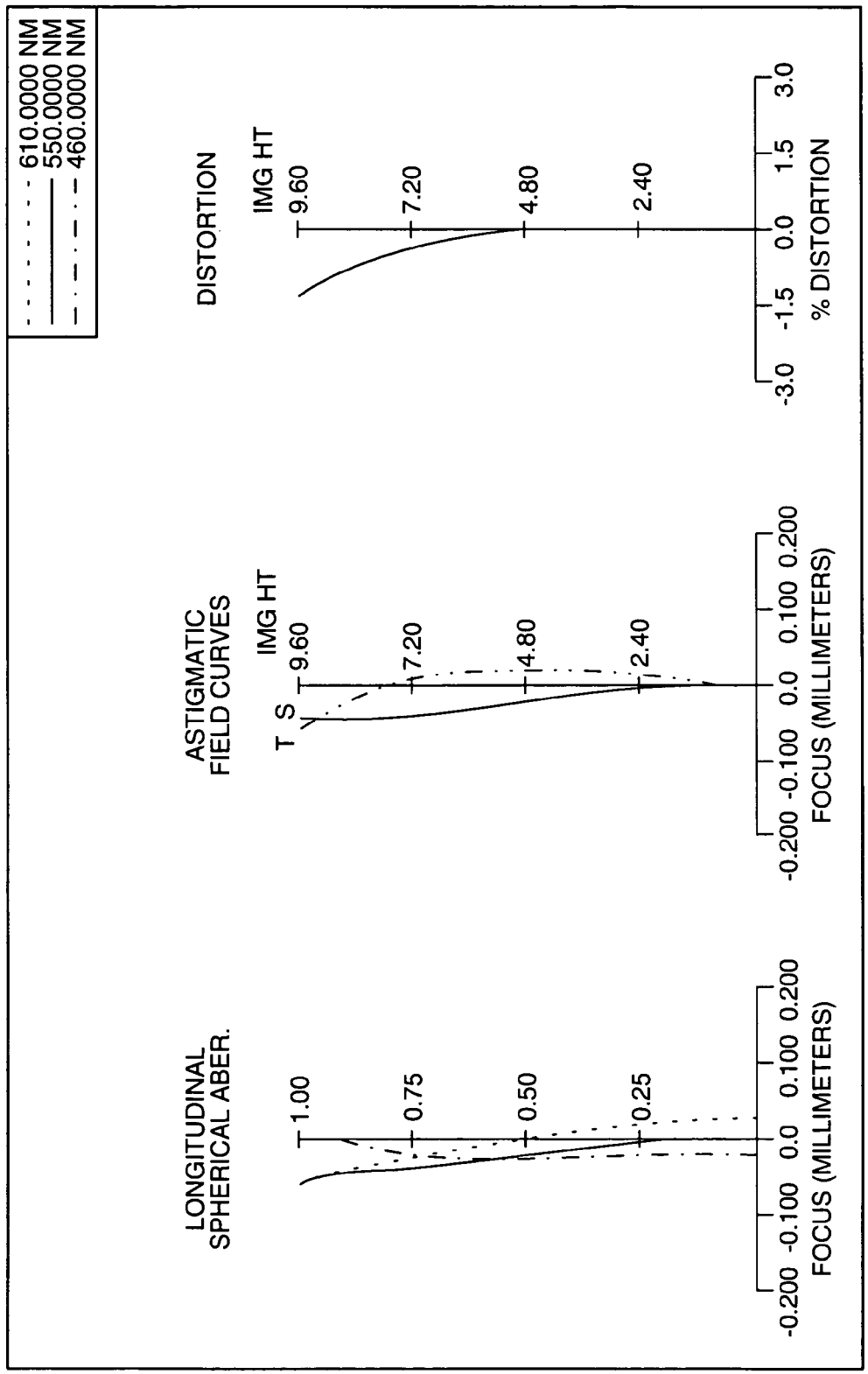
FIG. 7 shows spherical surface aberration, astigmatism, and distorting aberration at focal length mid-point in Example 2.

FIG. 7 shows aberrations at the focal length mid-point in Example 2. The left graph shows spherical aberrations of respective colors. The central graph shows astigmatism. The right graph shows distorting aberration.

Figure 8:
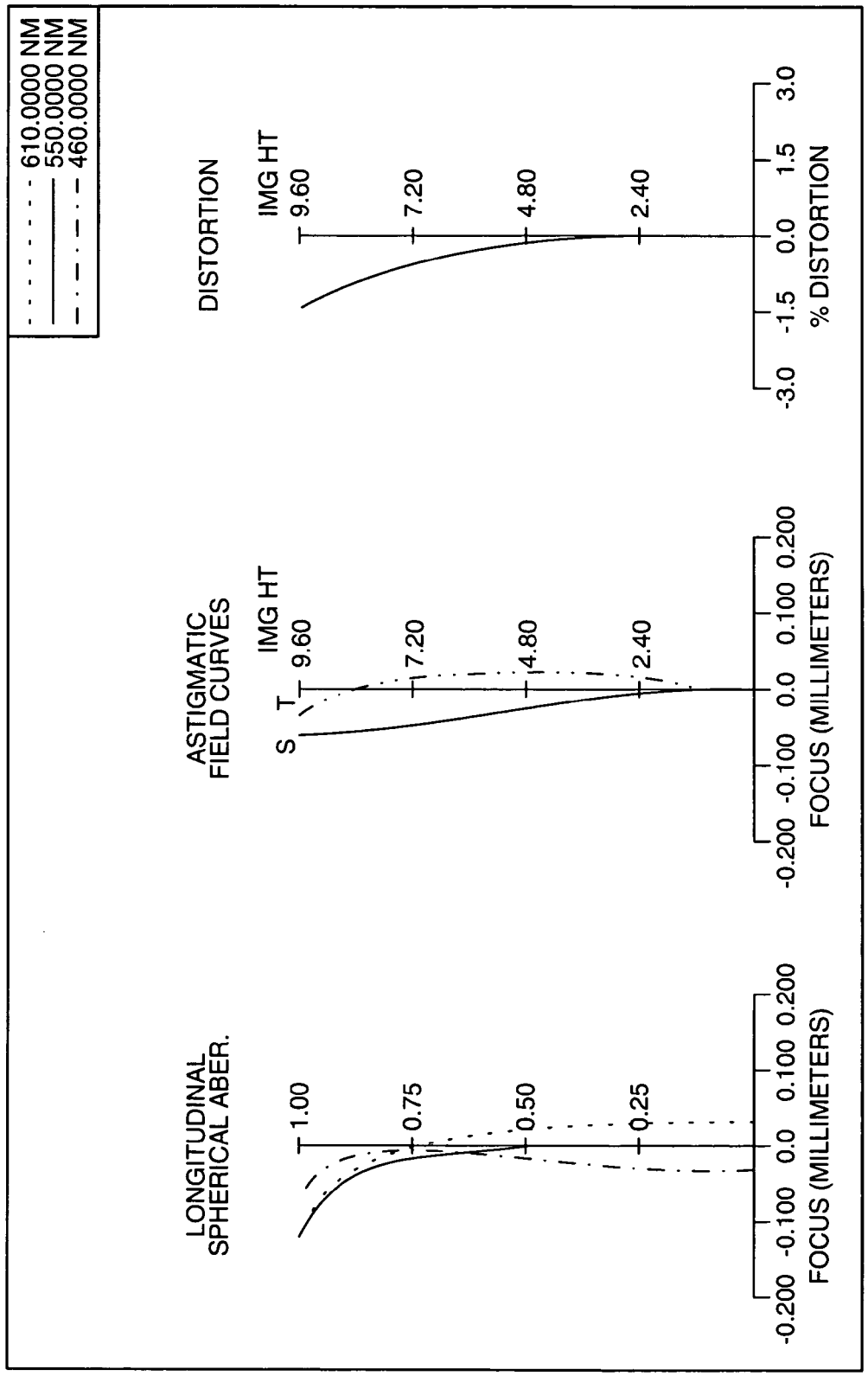
FIG. 8 shows spherical surface aberration, astigmatism, and distorting aberration at telephoto end Example 2.

FIG. 8 shows aberrations at the telephoto end in Example 2. The left graph shows spherical aberrations of respective colors. The central graph shows astigmatism. The right graph shows distorting aberration.

Third Embodiment

Figure 9:
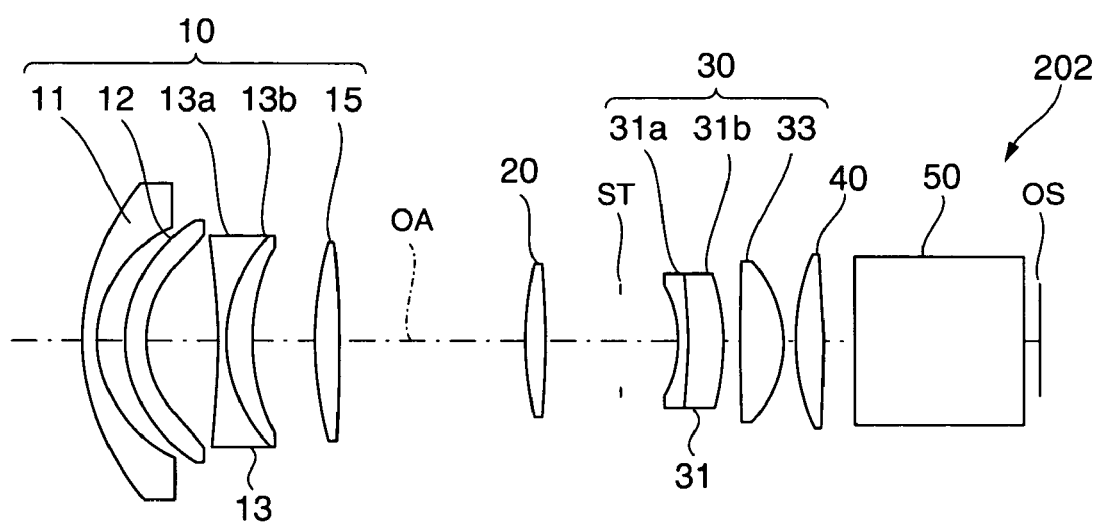
FIG. 9 illustrates a structure of a zoom lens according to a third embodiment.

FIG. 9 shows a lens structure of a zoom lens according to a third embodiment. This figure illustrates a zoom lens 202 at the wide angle end. The zoom lens 202 in this embodiment is a modification of the zoom lens 2 in the first embodiment shown in FIGS. 1A and 1B, and constructions not specifically explained herein are similar to those of the zoom lens 2 in the first embodiment.

The zoom lens 202 shown in FIG. 9 includes the first lens group 10 having negative power, the second lens group 20 having positive power, the third lens group 30 having positive power, and the fourth lens group 40 having positive power disposed in this order from the screen side to the object surface OS side. The zoom lens 202 is substantially telecentric on the object surface OS side. The synthesizing prism 50 is interposed between the fourth lens group 40 and the object surface OS.

In case of power change from the wide angle end side to the telephoto end side, the first lens group 10 of the three movable lens groups 10, 20 and 30 gradually shifts toward the object surface OS side along the optical axis OA. The second and third lens groups 20 and 30 gradually shift toward the screen side along the optical axis OA while varying the distance between each other. In case of power change from the telephoto end side to the wide angle end side, the first lens group 10 of the three movable lens groups 10, 20 and 30 gradually shifts toward the screen side along the optical axis OA. The second and third lens groups 20 and 30 gradually shift toward the object surface OS side along the optical axis OA while varying the distance between each other. Focusing when the distance to the screen is changed can be achieved by shifting the first lens group 10 in the direction of the optical axis OA.

The structure of the first lens group 10 is substantially the same as that of the first lens group 10 included in the zoom lens 2 in the first embodiment. However, the combination lens 13 has the negative lens 13a having concave surfaces on both sides and disposed on the screen side, and the positive meniscus lens 13b having convex surface on the screen side and disposed on the object surface OS side. The second through fourth lens groups 20 through 40 have the same structures as those of the zoom lens 2 in the first embodiment. The zoom lens 202 satisfies the conditional expressions (1) through (3) similarly to the zoom lens 2 in the first embodiment shown in FIGS. 1A and 1B, and obtains characteristics similar to those of the zoom lens 2 in the first embodiment.

EXAMPLE 3

Example 3 which numerically specifies the zoom lens 202 shown in FIG. 9 is now discussed. The following Table 3 slows lens data of the zoom lens 202 in Example 3.

TABLE 3

Example 3
f = 9.8-14.7
FNo = 1.77-2.0
2ω = 88.9°-66.5°

| surface No. | r | D | Nd | Vd |
|---|---|---|---|---|
| 0 | | d0 | | |
| 1 | 40.236 | 2.50 | 1.84666 | 23.78 |
| 2 | 21.563 | 4.64 | | |
| 3 | 26.468 | 3.50 | 1.52500 | 56.70 |
| 4 | 17.645 | 11.59 | | |
| 5 | −110.701 | 1.30 | 1.77250 | 49.62 |
| 6 | 25.000 | 4.20 | 1.80518 | 25.46 |
| 7 | 34.378 | 10.23 | | |
| 8 | 61.813 | 4.00 | 1.84666 | 23.78 |
| 9 | −308.850 | d9 | | |
| 10 | 45.962 | 3.04 | 1.83400 | 37.35 |
| 11 | −1120.646 | d11 | | |
| diaphragm | ∞ | 9.03 | | |
| 13 | −21.855 | 3.50 | 1.84666 | 23.78 |
| 14 | 121.704 | 4.20 | 1.58913 | 61.25 |
| 15 | −31.472 | 2.51 | | |
| 16 | 188.033 | 7.40 | 1.49700 | 81.61 |
| 17 | −20.153 | d17 | | |
| 18 | 41.358 | 4.20 | 1.48749 | 70.44 |
| 19 | −191.688 | 5.00 | | |
| 20 | ∞ | 27.60 | 1.51680 | 64.20 |
| 21 | ∞ | 3.00 | | |

| variable distance | wide angle end | focal length mid-point | telephoto end |
|---|---|---|---|
| d0 | 2000.00 | 2000.00 | 2000.00 |
| d9 | 30.55 | 12.29 | 2.04 |
| d11 | 13.22 | 14.69 | 15.54 |
| d17 | 2.00 | 8.80 | 14.66 |

TABLE 3-continued

Example 3
f = 9.8-14.7
FNo = 1.77-2.0
2ω = 88.9°-66.5°

| aspherical surface coefficient | surface 3 | surface 4 | surface 15 |
|---|---|---|---|
| K | 0.00000E+00 | −2.50000E−01 | 0.00000E+00 |
| A04 | 1.29378E−05 | 1.54285E−06 | 2.46775E−05 |
| A06 | −5.60851E−08 | −1.34652E−07 | 5.27706E−08 |
| A08 | 1.93182E−10 | 4.01388E−10 | 2.52924E−10 |
| A10 | −1.84428E−13 | −6.46708E−13 | −9.17664E−13 |
| A12 | 0.00000E+00 | −6.27281E−16 | 0.00000E+00 |

In the upper section of Table 3; "surface No.", "r", "D", "Nd", "Vd" and other items are shown. In the middle section of Table 3, values of the respective distances d0, d9, d11 and d17 at "wide angle end", "focal length mid-point" and "telephoto end" in Example 3 are shown. In Example 3, the surface Nos. 3, 4 and 15 are aspherical surfaces similarly to those in Example 1 shown in Table and have aspherical surface shapes corresponding to the respective coefficients "k", and "A04"-"A12" shown in the section column of Table 3.

The resultant specifications in Example 3 are f=9.8-14.7 as focal length f, FNo=1.77-2.0 as f number, and 2ω=88.9°-66.5° as angle of view 2ω in this case.

Figure 10:
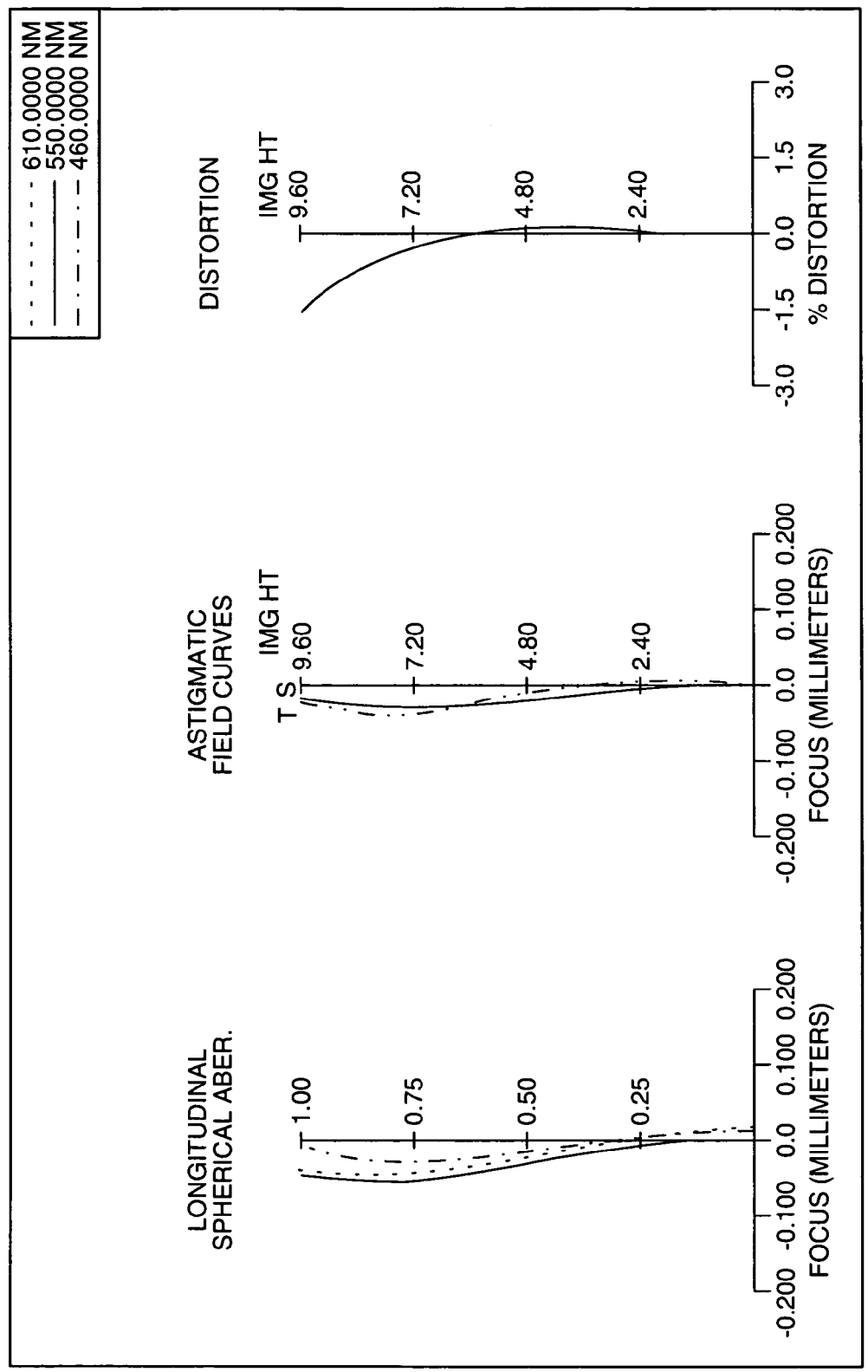
FIG. 10 shows spherical surface aberration, astigmatism, and distorting aberration at wide angle end in Example 3.

FIG. 10 shows aberrations at the wide angle end in Example 3. These are aberrations on the reduction side when the distance on the enlargement side is 2 m. The left graph in the figure shows spherical aberrations of respective colors at reference wavelength of 550 nm and other wavelengths of 610 nm and 460 nm. The central graph in the figure shows astigmatism at the wavelength of 550 nm. The right graph in the figure shows distorting aberration at wavelength of 550 nm.

Figure 11:
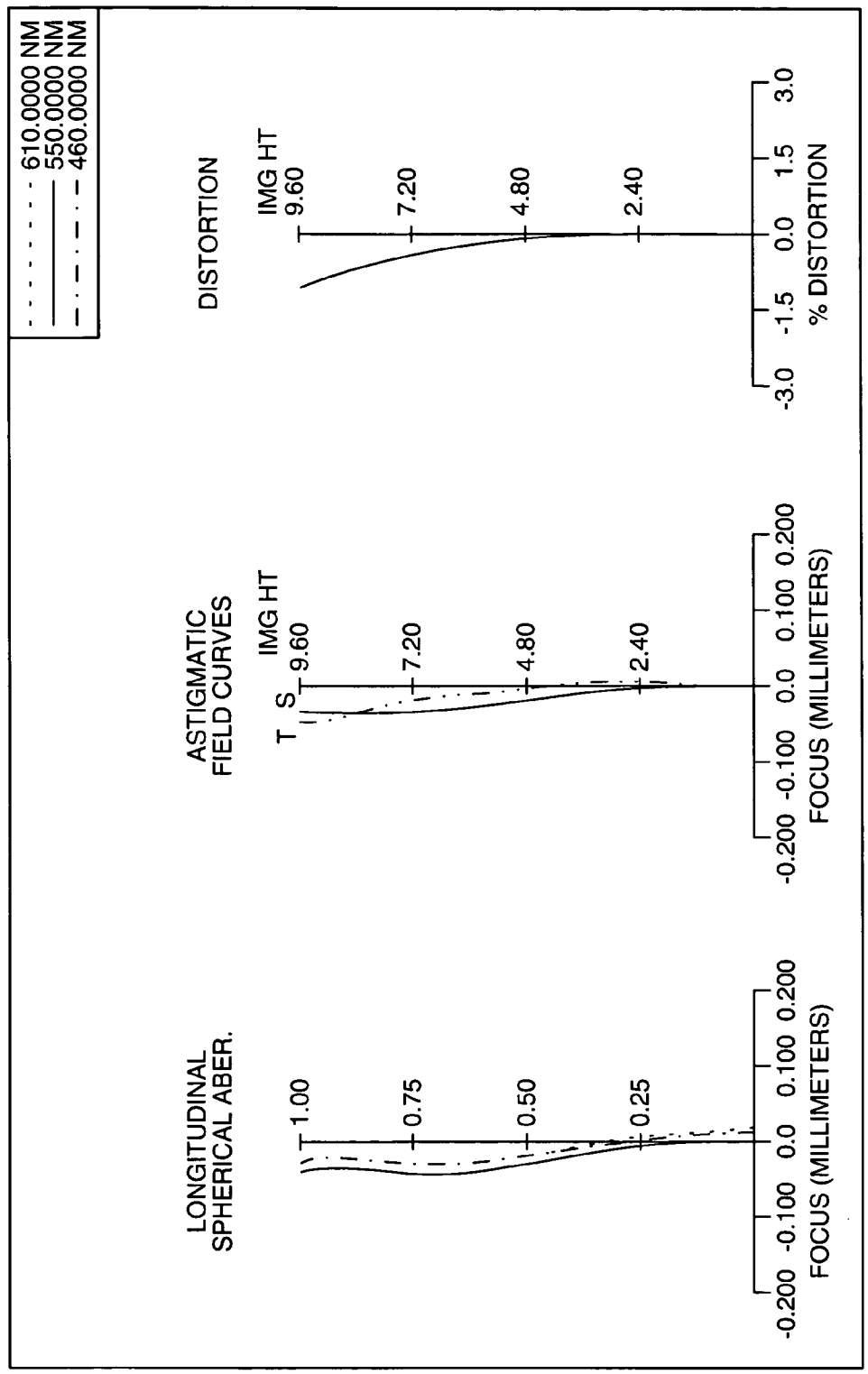
FIG. 11 shows spherical surface aberration, astigmatism, and distorting aberration at focal length mid-point in Example 3.

FIG. 11 shows aberrations at the focal length mid-point in Example 3. The left graph shows spherical aberrations of respective colors. The central graph shows astigmatism. The right graph shows distorting aberration.

Figure 12:
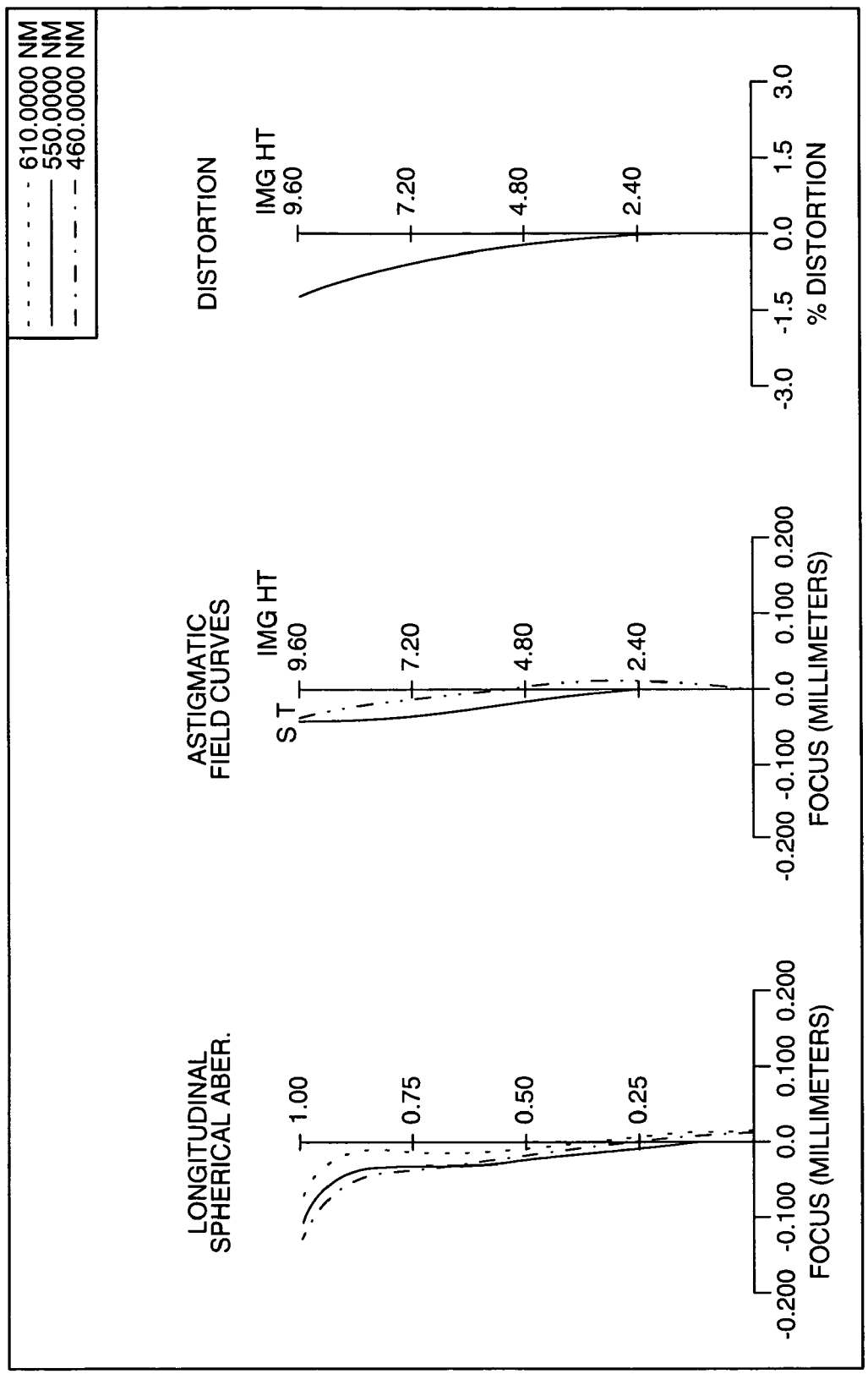
FIG. 12 shows spherical surface aberration, astigmatism, and distorting aberration at telephoto end in Example 3.

FIG. 12 shows aberrations at the telephoto end in Example 3. The left graph shows spherical aberrations of respective colors. The central graph shows astigmatism. The right graph shows distorting aberration.

Fourth Embodiment

Figure 13:
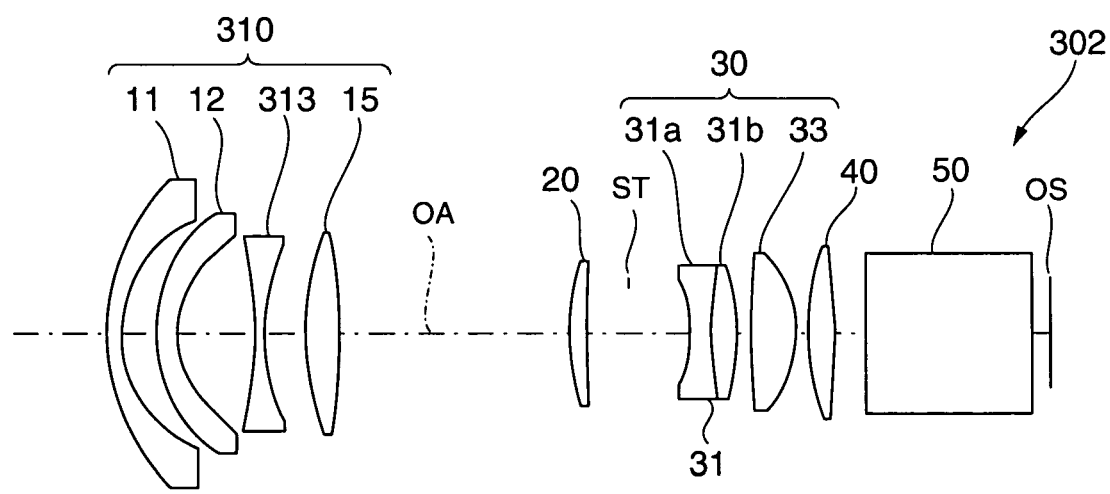
FIG. 13 illustrates a structure of a zoom lens according to a fourth embodiment.

FIG. 13 shows a lens structure of a zoom lens according to a fourth embodiment. This figure illustrates a zoom lens 302 at the wide angle ends. The zoom lens 302 in this embodiment is a modification of the zoom lens 2 in the first embodiment shown in FIGS. 1A and 1B, and constructions not specifically explained herein are similar to those of the zoom lens 2 in the first embodiment.

The zoom lens 302 shown in FIG. 13 includes a first lens group 310 having negative power, the second lens group 20 having positive power, the third lens group 30 having positive power, and the fourth lens group 40 having positive power disposed in this order from the screen side to the object surface OS side. The zoom lens 302 is substantially telecentric on the object surface OS side. The synthesizing prism 50 is interposed between the fourth lens group 40 and the object surface OS.

In case of power change from the wide angle end side to the telephoto end side, the first lens group 310 of the three movable lens groups 310, 20 and 30 gradually shifts toward the object surface OS side along the optical axis OA. The second and third lens groups 20 and 30 gradually shift toward the screen side along the optical axis QA while varying the distance between each other. In case of power change from the telephoto end side to the wide angle end side, the first lens group 310 of the three movable lens groups 310, 20 and 30 gradually shifts toward the screen side along the optical axis OA. The second and third lens groups 20 and 30 gradually shift toward the object surface OS side along the optical axis OA while varying the distance between each other. Focusing when the distance to the screen is changed can be achieved by shifting the first lens group 310 in the direction of the optical axis OA.

The structure of the first lens group 310 is substantially the same as that included in the zoom lens 2 in the first embodiment. However, a negative lens 313 having concave surfaces on both sides is provided instead of the combination lens 13 shown in FIGS. 1A and 1B. Thus, the first lens group 310 has four sections and four lenses. The second lens group 20 has a positive meniscus lens having convex surface on the screen side. The third and fourth lens groups 30 and 40 have the same structures as those of the zoom lens 2 in the first embodiment. The zoom lens 302 satisfies the conditional expressions (1) through (3) similarly to the zoom lens 2 in the first embodiment shown in FIGS. 1A and 1B, and obtains characteristics similar to those of the zoom lens 2 in the first embodiment.

EXAMPLE 4

Example 4 which numerically specifies the zoom lens 302 shown in FIG. 13 is now discussed. The following Table 4 shows lens data of the zoom lens 302 in Example 4.

TABLE 4

Example 4
f = 9.8-14.7
FNo = 1.91-2.16
2ω = 88.9°-66.5°

| surface No. | r | D | Nd | Vd |
|---|---|---|---|---|
| 0 | | d0 | | |
| 1 | 37.590 | 2.50 | 1.84666 | 23.78 |
| 2 | 21.906 | 5.97 | | |
| 3 | 33.952 | 3.50 | 1.52500 | 56.70 |
| 4 | 17.367 | 13.04 | | |
| 5 | −63.934 | 1.40 | 1.77250 | 49.62 |
| 6 | 39.536 | 6.97 | | |
| 7 | 55.456 | 5.50 | 1.80518 | 25.46 |
| 8 | −118.324 | d8 | | |
| 9 | 35.974 | 3.14 | 1.80610 | 33.27 |
| 10 | 662.843 | d10 | | |
| diaphragm | ∞ | 10.16 | | |
| 12 | −24.364 | 3.50 | 1.84666 | 23.78 |
| 13 | 53.801 | 4.20 | 1.58913 | 61.25 |
| 14 | −38.784 | 2.53 | | |
| 15 | 180.219 | 7.40 | 1.49700 | 81.61 |
| 16 | −21.179 | d16 | | |
| 17 | 47.236 | 4.41 | 1.48749 | 70.44 |
| 18 | −98.996 | 5.00 | | |
| 19 | ∞ | 27.60 | 1.51680 | 64.20 |
| 20 | ∞ | 3.00 | | |

| variable distance | wide angle end | focal length mid-point | telephoto end |
|---|---|---|---|
| d0 | 2000 | 2000 | 2000.00 |
| d8 | 38.4975 | 20.7515 | 11.01 |
| d10 | 7.151 | 8.121 | 8.87 |
| d16 | 2 | 8.757 | 14.41 |

TABLE 4-continued

Example 4
f = 9.8-14.7
FNo = 1.91-2.16
2ω = 88.9°-66.5°

| aspherical surface coefficient | surface 3 | surface 4 | surface 14 |
|---|---|---|---|
| K | 0.00000E+00 | −2.50000E−01 | 0.00000E+00 |
| A04 | 2.24611E−05 | 1.16691E−05 | 2.43293E−05 |
| A06 | −5.20836E−08 | −5.42206E−08 | 2.68557E−08 |
| A08 | 1.04333E−10 | −3.43475E−10 | 2.36833E−10 |
| A10 | −3.10919E−14 | 1.85759E−12 | −1.00377E−12 |
| A12 | 0.00000E+00 | −3.66766E−15 | 0.00000E+00 |

In the upper section of Table 4, "surface No.", "r", "3", "Nd", "Vd" and other items are shown. In the middle section of Table 4, values of the respective distances d0, d8, d10 and d16 at "wide angle end", "focal length mid-point" and "telephoto end" in Example 4 are showman. In Example 4, the surface Nos. 3, 4 and 14 are aspherical surfaces, and have aspherical surface shapes corresponding to the respective coefficients "k", and "A04"-"A12" shown in the lower section of Table 4.

The resultant specifications in Example 4 are f=9.8-14.7 as focal length f, FNo=1.91-2.16 as f number, and 2ω=88.9°-66.5° as angle of view 2ω in this case.

Figure 14:
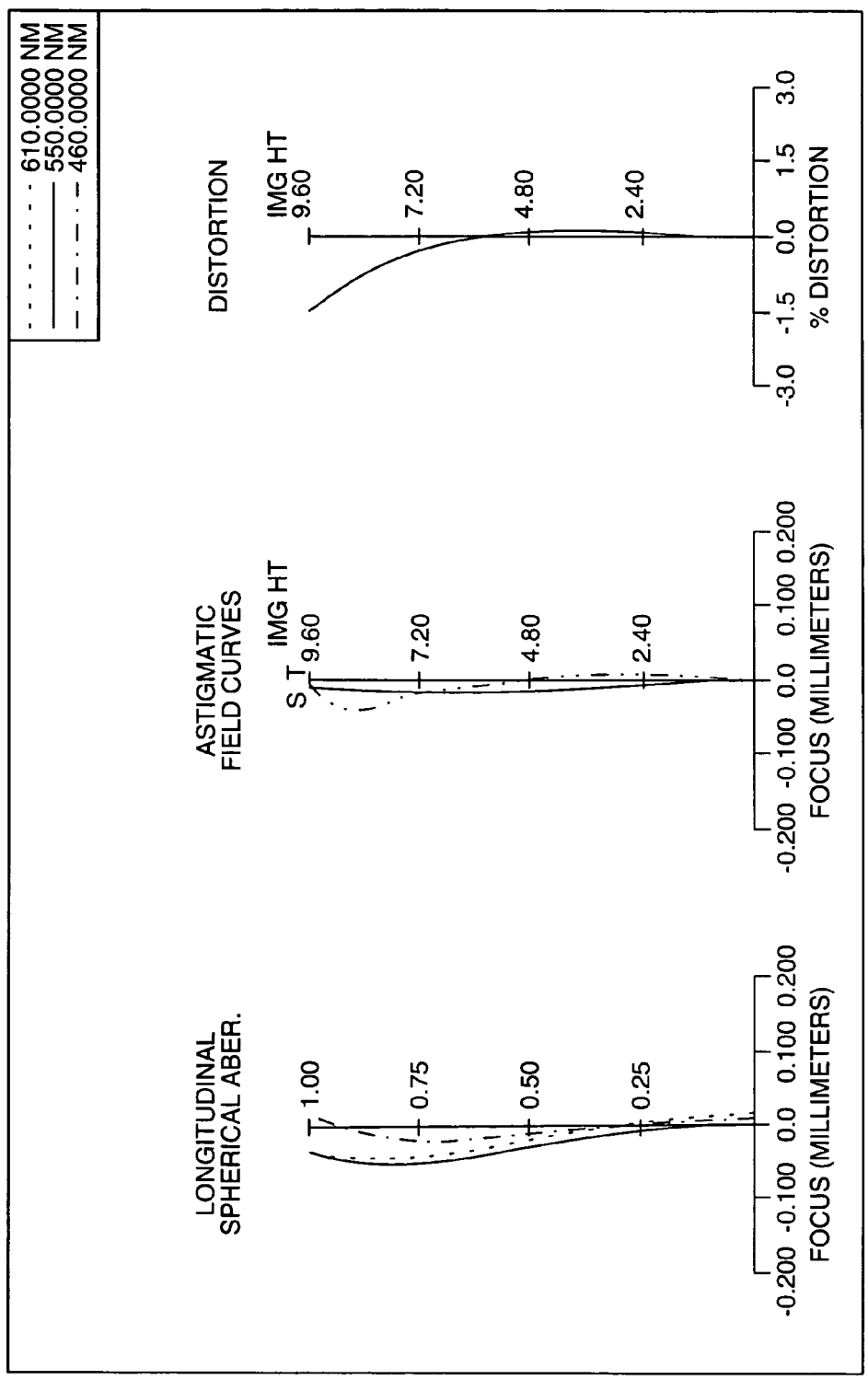
FIG. 14 shows spherical surface aberration, astigmatism, and distorting aberration at wide angle end in Example 4.

FIG. 14 shows aberrations at the wide angle end in Example 4. These are aberrations on the reduction side when the distance on the enlargement side is 2 m. The left graph in the figure shows spherical aberrations of respective colors at reference wavelength of 550 nm and other wavelengths of 610 nm and 460 nm. The central graph in the figure shows astigmatism at the wavelength of 550 nm. The right graph in the figure shows distorting aberration at wavelength of 550 nm.

Figure 15:
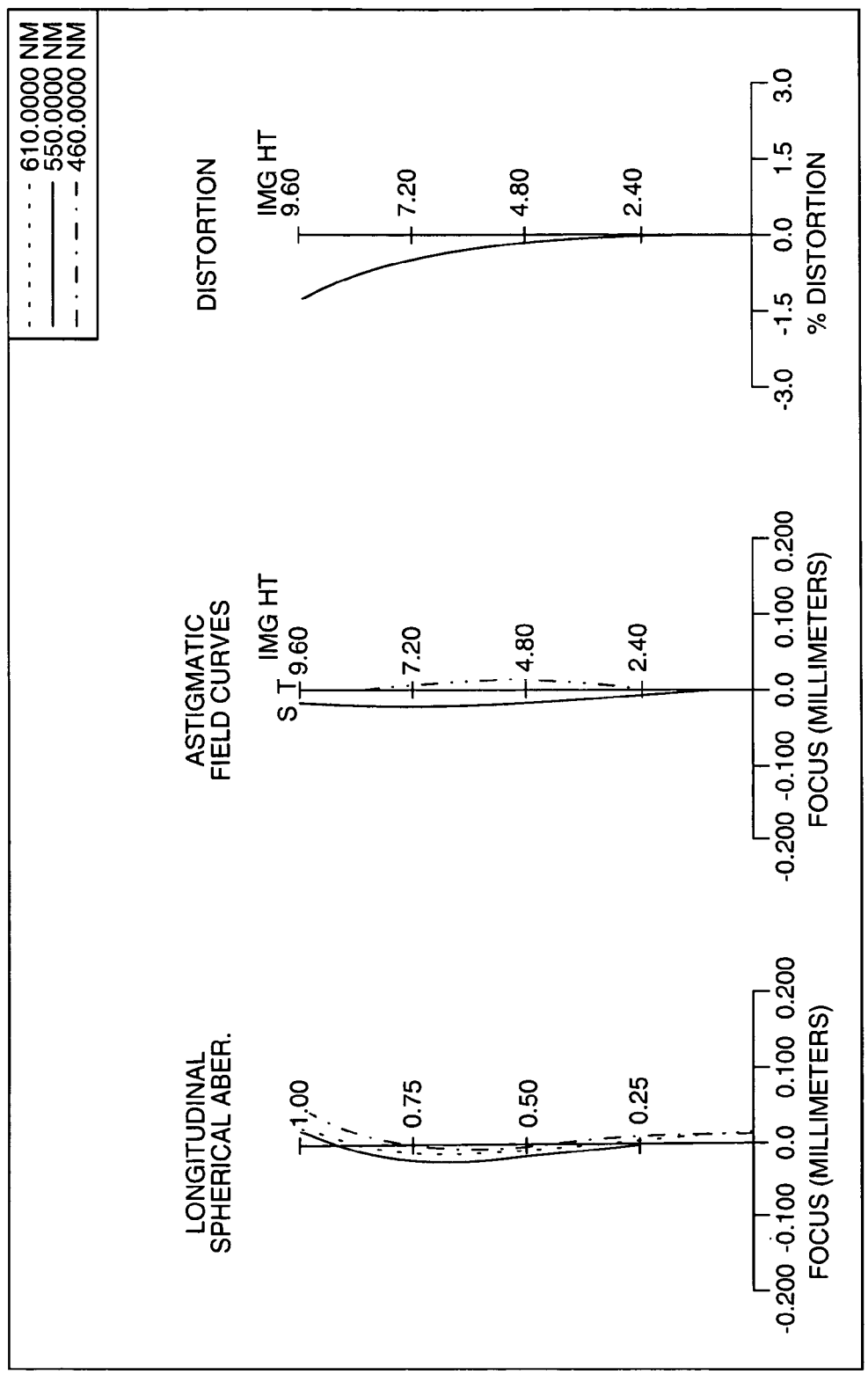
FIG. 15 shows spherical surface aberration, astigmatism, and distorting aberration at focal length mid-point in Example 4.

FIG. 15 shows aberrations at the focal length mid-point in Example 4. The left graph shows spherical aberrations of respective colors. The central graph shows astigmatism. The right graph shows distorting aberration.

Figure 16:
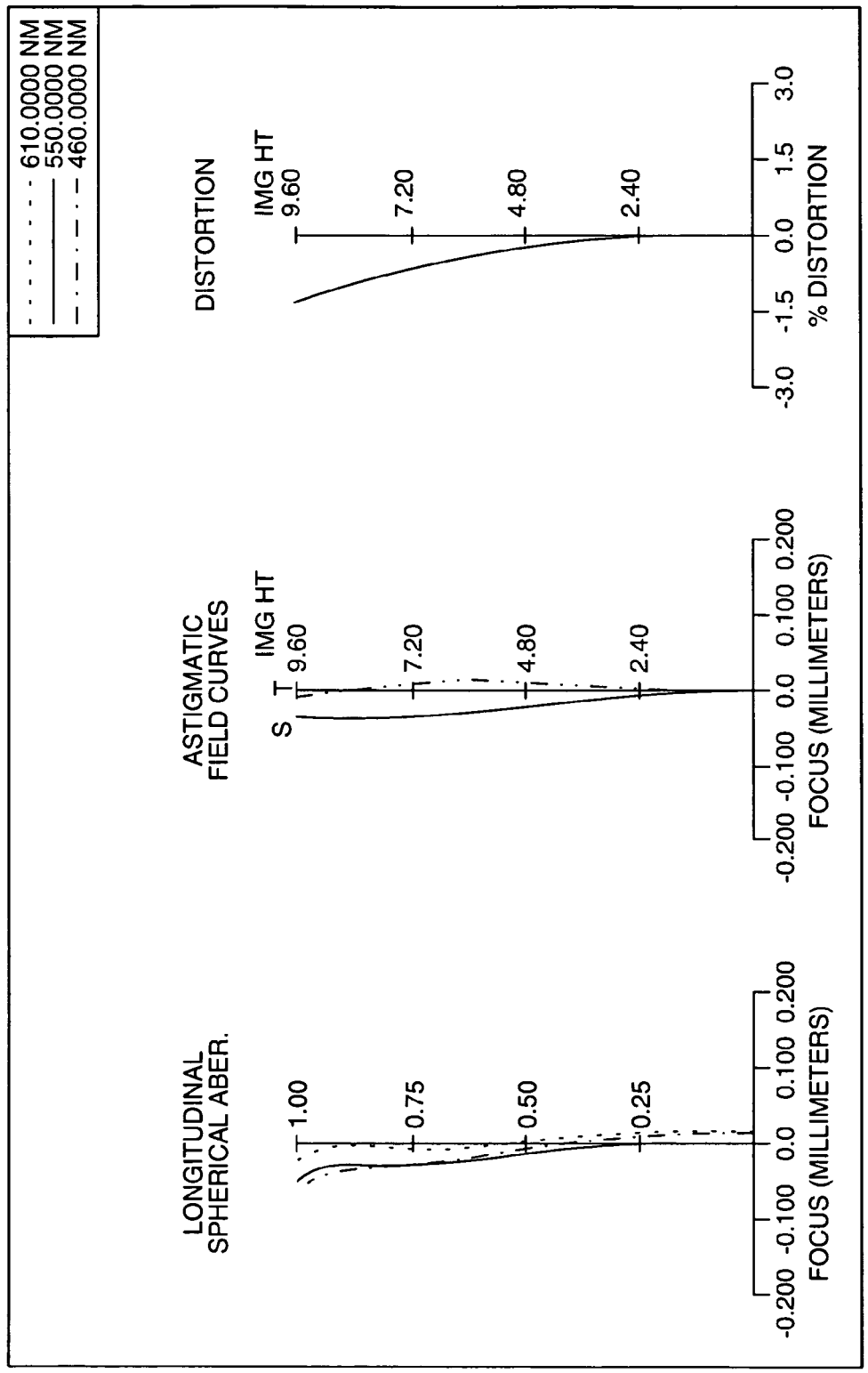
FIG. 16 shows spherical surface aberration, astigmatism, and distorting aberration at telephoto end in Example 4.

FIG. 16 shows aberrations at the telephoto end in Example 4. The left graph shows spherical aberrations of respective colors. The central graph shows astigmatism. The right graph shows distorting aberration.

Fifth Embodiment

Figure 17:
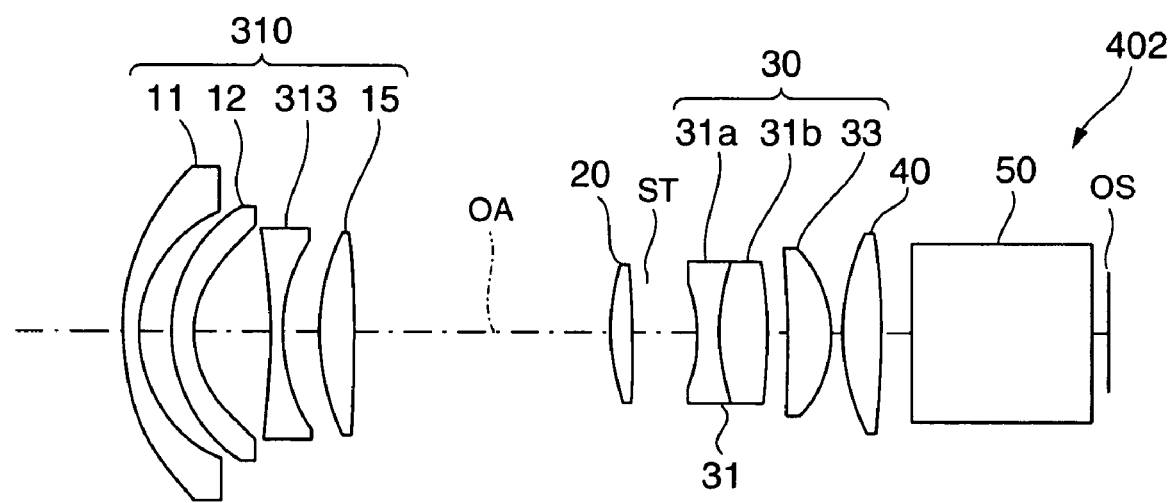
FIG. 17 illustrates a structure of a zoom lens according to a fifth embodiment.

FIG. 17 shows a lens structure of a zoom lens according to a fifth embodiment. This figure illustrates a zoom lens 402 at the wide angle end. The zoom lens 402 in this embodiment is a modification of the zoom lens 302 in the fourth embodiment shown in FIG. 13, and constructions not specifically explained herein are similar to those of the zoom lens 302 in the fourth embodiment.

The zoom lens 402 shown in FIG. 17 includes the first lens group 310 having negative power, the second lens group 20 having positive power, the third lens group 30 having positive power, and the fourth lens group 40 having positive power disposed in this order from the screen side to the object surface OS side. The zoom lens 402 is substantially telecentric on the object surface OS side. The synthesizing prism 50 is interposed between the fourth lens group 40 and the object surface OS.

In case of power change from the wide angle end side to the telephoto end side, the first lens group 310 of the three movable lens groups 310, 20 and 30 gradually shifts toward the object surface OS side along the optical axis OA. The second and third lens groups 20 and 30 gradually shift toward the screen side along the optical axis OA while varying the distance between each other. In case of power change from the telephoto end side to the wide angle end side, the first lens group 310 of the three movable lens groups 310, 20 and 30 gradually shifts toward the screen side along the optical axis OA. The second and third lens groups 20 and 30 gradually shift toward the object surface OS side along the optical axis OA while varying the distance between each other. Focusing when the distance to the screen is changed can be achieved by shifting the first lens group 310 in the direction of the optical axis OA.

The second lens group 20 has only one positive lens having convex surfaces on both of the screen side and the objective surface OS side. The third lens group 30 has two sections and three lenses containing: the combination lens 31 having convex surface on the object OS side; and the positive meniscus lens 33 having convex surface on the object surface OS side disposed in this order from the screen side. The combination lens 31 has the negative lens 31a having concave surfaces on both sides and disposed on the screen side, and the positive lens 31b having convex surfaces on both sides and disposed on the object surface OS. The object surface OS side of the combination lens 31, that is, the convex surface of the positive lens 31b is an aspherical surface. The first and fourth lens groups 310 and 40 have the same structures as those of the zoom lens 302 in the fourth embodiment. The zoom lens 402 satisfies the conditional expressions (1) through (3) similarly to the zoom lens 2 in the first embodiment shown in FIGS. 1A and 1B and other lens, and obtains characteristics similar to those of the zoom lens 2 in the first embodiment and other lens.

EXAMPLE 5

Example 5 which numerically specifies the zoom lens 402 shovel in FIG. 17 is now discussed. The following Table 5 shows lens data of the zoom lens 402 in Example 5.

TABLE 5

Example 5
f = 9.8-14.7
FNo = 1.9-2.21
2ω = 88.9°-66.5°

| surface No. | r | D | Nd | Vd |
|---|---|---|---|---|
| 0 | | d0 | | |
| 1 | 37.656 | 2.50 | 1.77250 | 49.62 |
| 2 | 22.280 | 5.48 | | |
| 3 | 31.994 | 3.50 | 1.52500 | 56.70 |
| 4 | 17.774 | 11.91 | | |
| 5 | −108.077 | 1.40 | 1.77250 | 49.62 |
| 6 | 26.062 | 5.92 | | |
| 7 | 37.205 | 5.50 | 1.68893 | 31.16 |
| 8 | −174.613 | d8 | | |
| 9 | 28.861 | 3.38 | 1.69895 | 30.05 |
| 10 | −293.967 | d10 | | |
| diaphragm | ∞ | 7.91 | | |
| 12 | −28.809 | 3.50 | 1.84666 | 23.78 |
| 13 | 34.439 | 7.71 | 1.58913 | 61.25 |
| 14 | −53.219 | 3.12 | | |
| 15 | −196.938 | 6.50 | 1.49700 | 81.61 |
| 16 | −22.340 | d16 | | |
| 17 | 36.014 | 6.20 | 1.48749 | 70.44 |
| 18 | −112.320 | 5.00 | | |
| 19 | ∞ | 27.60 | 1.51680 | 64.20 |
| 20 | ∞ | 3.00 | | |

TABLE 5-continued

Example 5
f = 9.8-14.7
FNo = 1.9-2.21
2ω = 88.9°-66.5°

| variable distance | wide angle end | focal length mid-point | telephoto end |
|---|---|---|---|
| d0 | 2000.00 | 2000.00 | 2000.00 |
| d8 | 40.64 | 26.26 | 18.39 |
| d10 | 2.36 | 3.07 | 3.44 |
| d16 | 2.00 | 10.65 | 18.04 |

| aspherical surface coefficient | surface 3 | surface 4 | surface 14 |
|---|---|---|---|
| K | 0.00000E+00 | −2.50000E−01 | 0.00000E+00 |
| A04 | 2.49242E−05 | 1.55907E−05 | 2.00087E−05 |
| A06 | −7.37664E−08 | −9.02703E−08 | 7.51651E−09 |
| A08 | 1.29614E−10 | −4.24926E−10 | 1.15198E−10 |
| A10 | −7.16408E−16 | 2.60431E−12 | −5.53157E−13 |
| A12 | 0.00000E+00 | −4.55866E−15 | 0.00000E+00 |

In the upper section of Table 5, "surface No.", "r", "D", "Nd", "Vd" and other items are shown. In the middle section of Table 5, values of the respective distances d0, d8, d10 and d16 at "wide angle end", "focal length mid-point" and "telephoto end" in Example 5 are shown. An Example 5, the surface Nos. 3, 4 and 14 are aspherical surfaces similarly to those in Example 1 shown in Table 1 and Example 4, and have aspherical surface shapes corresponding to the respective coefficients "k", and "A04"-"A12" shovel in the lower section of Table 5.

The resultant specifications in Example 5 are f=9.8-14.7 as focal length f, FNo=1.9-2.21 as f number, and 2ω=88.9°-66.5° as angle of view 2ω in this case.

Figure 18:
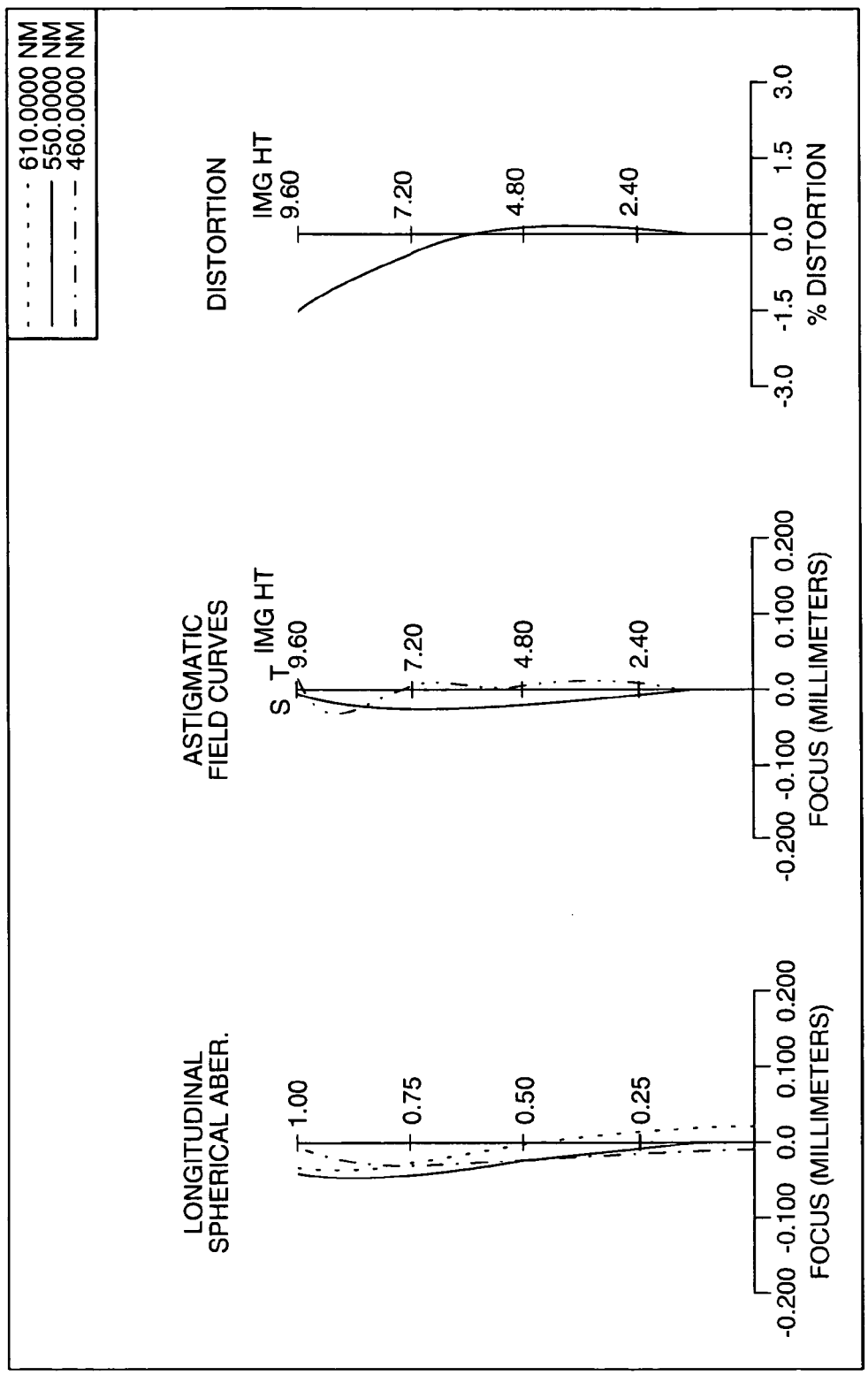
FIG. 18 shows spherical surface aberration, astigmatism, and distorting aberration at wide angle end in Example 5.

FIG. 18 shows aberrations at the wide angle end in Example 5. These are aberrations on the reduction side when the distance on the enlargement side is 2 m. The left graph in the figure shows spherical aberrations of respective colors at reference wavelength of 550 nm and other wavelengths of 610 nm and 460 nm. The central graph in the figure shows astigmatism at the wavelength of 550 nm. The right graph in the figure shows distorting aberration a wavelength of 550 nm.

Figure 19:
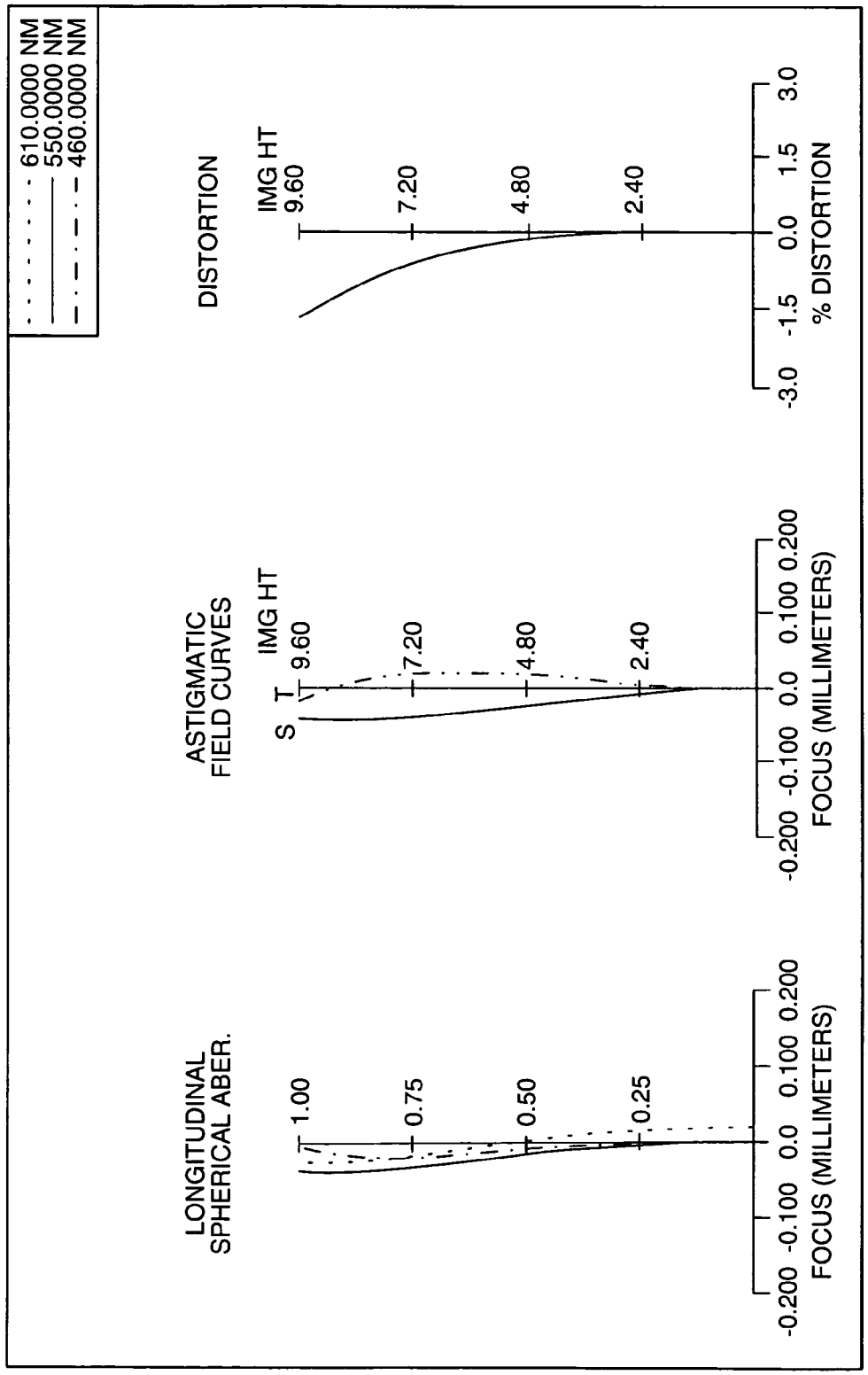
FIG. 19 shows spherical surface aberration, astigmatism, and distorting aberration at focal length mid-point in Example 5.

FIG. 19 shows aberrations at the focal length mid-point in Example 5. The left graph shows spherical aberrations of respective colors. The central graph snows astigmatism. The right graph shows distorting aberration.

Figure 20:
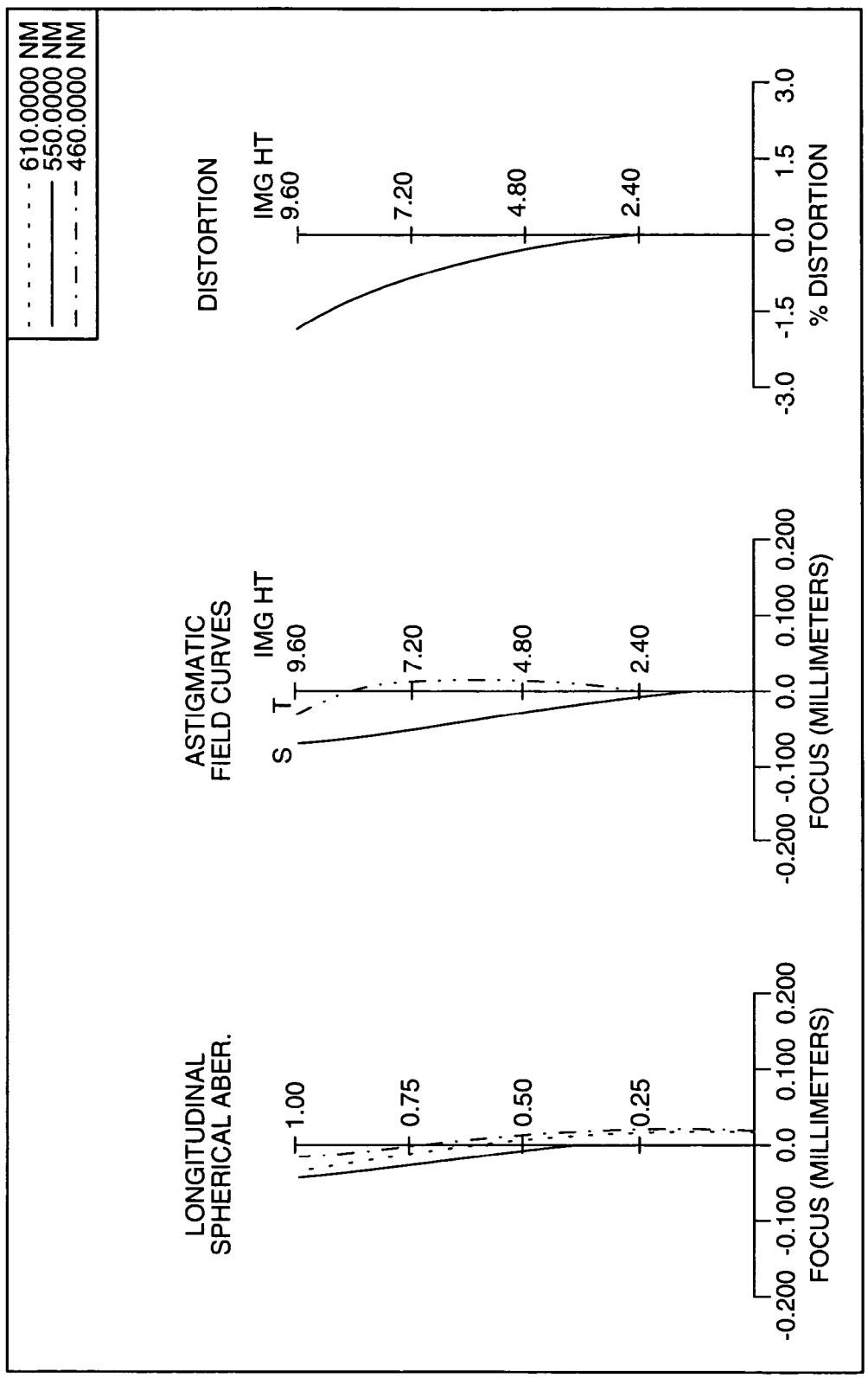
FIG. 20 shows spherical surface aberration, astigmatism, and distorting aberration at telephoto end in Example 5.

FIG. 20 shows aberrations at the telephoto end in Example 5. The left graph shows spherical aberrations of respective colors. The central graph shows astigmatism. The right graph shows distorting aberration.

Sixth Embodiment

Figure 21:
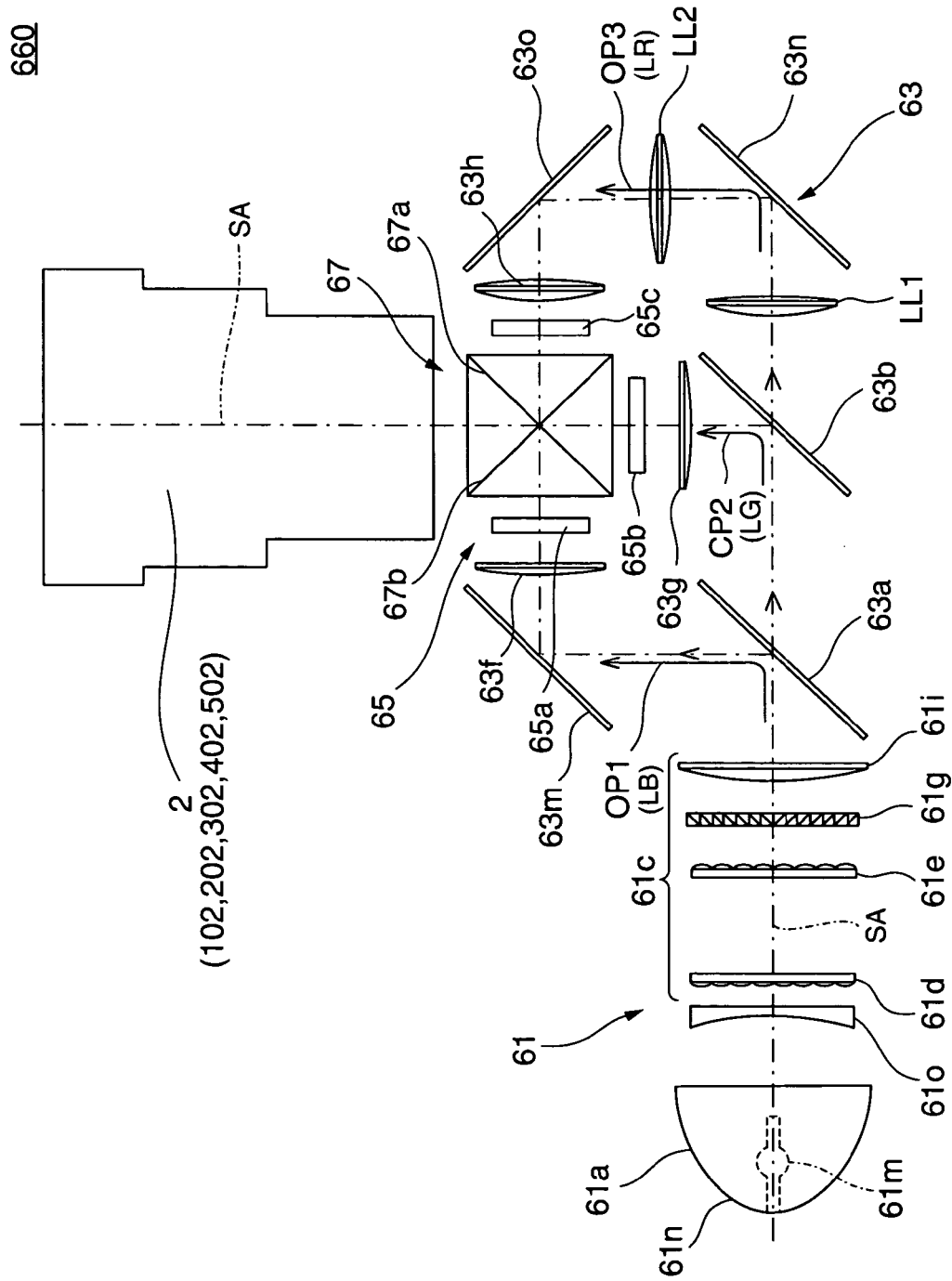
FIG. 21 illustrates a projector including the zoom lens according to one of the above embodiments.

A projector 660 including the zoom lens 2, 102, 202, 302, 402 or 502 having the above structure is now described with reference to FIG. 21.

The projector 660 contains a light source device 61 which emits equalized source light along a system optical axis SA, a illumination dividing system 63 which divides illumination light emitted from the light source device 61 into three color lights of red, green and blue, a light modulating device 65 which receives the illumination lights of respective colors released from the illumination dividing system 63, a cross dichroic prism 67 which synthesizes the modulated lights of respective colors having passed through the light modulating device 65, and a projection lens 69 which projects image light released from the cross dichroic prism 67.

The light source device 61 has a light source device 61a for emitting source light, and an equalizing optical system 61c for converting the source light emitted from the light source device 61a into illumination light having uniform and predetermined polarization direction. The light source device 61a has a light source lamp 61m and a reflector 61n. The equalizing optical system 61c has a first lens array 61d for dividing the source light into partial lights, a second lens array 61e for controlling expansion of the divided partial lights, a polarization converting device 61g for equalizing the polarization directions of the respective partial lights, and a superposing lens 61i for superposing the respective partial lights on an illumination area as illumination target and inputting the lights into that area.

The illumination dividing system 63 has first and second dichroic mirrors 63a and 63b, and optical path bending mirrors 63m, 63n and 63o. The illumination dividing system 63 divides illumination light into three color lights of blue light LB, green light LG, and red light LR by diverging the system optical axis SA into three optical paths OP1 through OP3. Relay lenses LL1 and LL2 transmit an image formed immediately before the first relay lens LL1 on the entrance side to a field lens 63h on the exit side in such a manner that the image is substantially unchanged when the image reaches the field lens 63h. This structure can prevent lowering of light utilization efficiency caused due to diffusion of light or other causes.

The light modulating device 66 has three liquid crystal light valves 65a, 65b and 65c into which the three color illumination lights LB, LG and LR enter, respectively. The liquid crystal light valves 65a, 65b and 65c modulate intensities of the respective color lights LB, LG and LR having entered the respective liquid crystal light valves 65a, 65b and 65c for each pixel according to driving signals. Each of the liquid crystal light valves 65a, 65b and 65c has a liquid crystal display panel sandwiched between a pair of polarization panels.

The cross dichroic prism 67 has dichroic films 67a and 67b crossing each other, and releases image light produced by synthesizing modulated lights received from the respective liquid crystal light valves 65a, 65b and 65c. The zoom lens 2, 102, 202, 302, 402 or 502 enlarges the projection lens enlarges the image light obtained by synthesis of the cross dichroic prism 67 by appropriate enlargement rate, and projects the enlarged image light on a not-shown screen as a color image.

The liquid crystal panels constituting the respective liquid crystal light valves 65a, 65b and 65c correspond to the object surface OS shown in FIGS. 1A and 1B and other figures.

According to the projector 660 in this embodiment, the zoom lens 2, 102, 202, 302, 402, or 502 which is substantially telecentric on the object surface OS side, can project a clear image on the screen without lowering image quality of the liquid crystal display panel which has angle dependency. In addition, as apparent from the above description, the zoom lens 2, 102, 202, 302, or 402 can sufficiently compensate aberration at the time of wide angle even in case of providing relatively large angle of view by using a small number of lenses. In this case, relatively high variable power ratio can be achieved. Thus, the projector 660 including the zoom lens 2, 102, 202, 302, or 402 can project a large image even when installed in a small room. Accordingly, the projector 660 offers high degree of freedom for installation, and maintains relatively low cost.

It is possible to use image forming devices other than the liquid crystal light valves 65a, 65b, and 65c. For example, a light modulating device, a film, and a slide as a device whose pixels contain micro-mirrors may be employed.

The entire disclosure of Japanese Patent Application No. 2006-29995, filed Nov. 6, 2006 is expressly incorporated by reference herein.

What is claimed is:

1. A zoom lens, comprising:
   a first lens group having negative power, a second lens group having positive power, a third lens group having positive power, and a fourth lens group having positive power, disposed in this order from the enlargement side, wherein
   at the time of zooming from the wide angle side to the telephoto side, the first lens group shifts from the enlargement side to the reduction side and the second and third lens groups shift from the reduction side to the enlargement side and the fourth lens group is fixed,
   the overall length of the zoom lens becomes a maximum at the wide angle end,
   the second lens group consists of one positive lens having a convex surface on the enlargement side, and
   assuming that the focal length of the entire system at the wide angle end is Fw and that the focal length of the second lens group is F2, the second lens group satisfies the following conditional expression:

$0.1 < |Fw/F2| < 0.35$.

2. The zoom lens according to claim 1, wherein:
   the first lens group consists of three negative lenses and at least one positive lens;
   the lens having the weakest negative power in the first lens group is an aspherical surface lens; and
   assuming that the focal length of the first lens group is F1, the first lens group satisfies the following conditional expression:

$0.25 < |Fw/F1| < 0.45$.

3. The zoom lens according to claim 1, wherein the first lens group consists of four sections and five lenses containing: a negative meniscus lens having a convex surface on the enlargement side, a negative meniscus lens having the weakest negative power in the first lens group and having a convex surface on the enlargement side, a combination lens having a positive lens and a negative lens and having a concave surface on the reduction side, and a positive lens having a convex surface on the enlargement side, disposed in this order from the enlargement side.

4. The zoom lens according to claim 1, wherein the first lens group consists of four sections and four lenses containing: a negative meniscus lens having a convex surface on the enlargement side, a negative meniscus lens having the weakest negative power in the first lens group and having a convex surface on the enlargement side, a negative lens having the strongest negative power in the first lens group and having concave surfaces on both sides, and a positive lens having convex surfaces on both sides, disposed in this order from the enlargement side.

5. The zoom lens according to claim 1, wherein:
   the third lens group consists of a combination lens having a negative lens and a positive lens, and a positive lens having a convex surface on the reduction side, disposed in this order from the enlargement side; and
   at least the reduction side surface of the combination lens is an aspherical surface.

6. The zoom lens according to claim 1, wherein:
   the fourth lens group consists of one positive lens having a convex surface on the enlargement side; and assuming that the focal length of the fourth lens group is F4, the fourth lens group satisfies the following conditional expression:

$0.05 < |Fw/F4| < 0.3$.

7. A projector, comprising:
an image forming device that forms an image; and
a zoom lens that projects the image formed by the image forming device, the zoom lens including:
a first lens group having negative power, a second lens group having positive power, a third lens group having positive power, and a fourth lens group having positive power, disposed in this order from the enlargement side, wherein
at the time of zooming from the wide angle side to the telephoto side, the first lens group shifts from the enlargement side to the reduction side and the second and third lens groups shift from the reduction side to the enlargement side and the fourth lens group is fixed, and
the overall length of the zoom lens becomes a maximum at the wide angle end,
wherein the second lens group consists of one positive lens having a convex surface on the enlargement side; and
assuming that the focal length of the entire system at the wide angle end is Fw and that the focal length of the second lens group is F2, the second lens group satisfies the following conditional expression:

$0.1 < |Fw/F2| < 0.35$.

8. The projector according to claim 7, wherein:
the first lens group consists of three negative lenses and at least one positive lens;
the lens having the weakest negative power in the first lens group is an aspherical surface lens; and
assuming that the focal length of the entire system at the wide angle end is Fw and that the focal length of the first lens group is F1, the first lens group satisfies the following conditional expression:

$0.25 < |Fw/F1| < 0.45$.

9. The projector according to claim 7, wherein the first lens group consists of four sections and five lenses containing: a negative meniscus lens having a convex surface on the enlargement side, a negative meniscus lens having the weakest negative power in the first lens group and having a convex surface on the enlargement side, a combination lens having a positive lens and a negative lens and having a concave surface on the reduction side, and a positive lens having a convex surface on the enlargement side, disposed in this order from the enlargement side.

10. The projector according to claim 7, wherein the first lens group consists of four sections and four lenses containing: a negative meniscus lens having a convex surface on the enlargement side, a negative meniscus lens having the weakest negative power in the first lens group and having a convex surface on the enlargement side, a negative lens having the strongest negative power in the first lens group and having concave surfaces on both sides, and a positive lens having convex surfaces on both sides, disposed in this order from the enlargement side.

11. The projector according to claim 7, wherein:
the third lens group consists of a combination lens having a negative lens and a positive lens, and a positive lens having a convex surface on the reduction side, disposed in this order from the enlargement side; and
at least the reduction side surface of the combination lens is an aspherical surface.

12. The projector according to claim 7, wherein:
the fourth lens group consists of one positive lens having a convex surface on the enlargement side; and
assuming that the focal length of the entire system at the wide angle end is Fw and that the focal length of the fourth lens group is F4, the fourth lens group satisfies the following conditional expression:

$0.05 < |Fw/F4| < 0.3$.

* * * * *